United States Patent
Bhattacharyya et al.

(10) Patent No.: US 10,546,233 B1
(45) Date of Patent: Jan. 28, 2020

(54) METHOD AND SYSTEM TO PREDICT AND INTERPRET CONCEPTUAL KNOWLEDGE IN THE BRAIN

(71) Applicant: HRL Laboratories, LLC, Malibu, CA (US)

(72) Inventors: Rajan Bhattacharyya, Sherman Oaks, CA (US); James Benvenuto, Beverly Hills, CA (US); Matthew E. Phillips, Calabasas, CA (US); Matthias Ziegler, Oakton, VA (US); Michael D. Howard, Westlake Village, CA (US); Suhas E. Chelian, San Jose, CA (US); Rashmi N. Sundareswara, Los Angeles, CA (US); Vincent De Sapio, Westlake Village, CA (US); David L. Allen, Thousand Oaks, CA (US)

(73) Assignee: HRL Laboratories, LLC, Malibu, CA (US)

( * ) Notice: Subject to any disclaimer, the term of this patent is extended or adjusted under 35 U.S.C. 154(b) by 1071 days.

(21) Appl. No.: 14/978,814

(22) Filed: Dec. 22, 2015

Related U.S. Application Data

(63) Continuation-in-part of application No. 14/807,083, filed on Jul. 23, 2015, now Pat. No. 10,360,506, and
(Continued)

(51) Int. Cl.
*G06N 3/06* (2006.01)
*G06N 3/063* (2006.01)
*G06N 3/10* (2006.01)

(52) U.S. Cl.
CPC ............. *G06N 3/063* (2013.01); *G06N 3/105* (2013.01)

(58) Field of Classification Search
None
See application file for complete search history.

(56) References Cited

U.S. PATENT DOCUMENTS

| 8,190,422 B2 | 5/2012 | Ascoli et al. |
| 8,204,623 B1 | 6/2012 | Bhattacharyya |
| (Continued) | | |

FOREIGN PATENT DOCUMENTS

| JP | 2013-235398 | 11/2013 |
| WO | 2013-144552 | 10/2013 |

OTHER PUBLICATIONS

Mitchell et al., "Predicting human brain activity associated with the meanings of nouns", Science, vol. 320, pp. 1191-1195. (Year: 2008).*

(Continued)

*Primary Examiner* — Paulinho E Smith
(74) *Attorney, Agent, or Firm* — Tope-McKay & Associates

(57) ABSTRACT

Described is a system for explaining how the human brain represents conceptual knowledge. A semantic model is developed, and a behavioral exam is performed to assess a calibration subject into a cohort and reveal semantic relationships to modify a personalized semantic space developed by the semantic model. Semantic features are extracted from the personalized semantic space. Neural features are extracted from neuroimaging of the human subject. A neuroceptual lattice is created having nodes representing attributes by aligning the semantic features and the neural features. Structures in the neuroceptual lattice are identified to quantify an extent to which the set of neural features represents a target concept. The identified structures are used to interpret conceptual knowledge in the brain of a test subject.

20 Claims, 18 Drawing Sheets

Related U.S. Application Data a continuation-in-part of application No. 14/489,313, filed on Sep. 17, 2014, now Pat. No. 9,646,248, said application No. 14/807,083 is a continuation-in-part of application No. 14/489,313, filed on Sep. 17, 2014, now Pat. No. 9,646,248.

(60) Provisional application No. 62/095,574, filed on Dec. 22, 2014, provisional application No. 62/028,083, filed on Jul. 23, 2014, provisional application No. 62/028,171, filed on Jul. 23, 2014.

(56) References Cited

U.S. PATENT DOCUMENTS

| | | | |
|---|---|---|---|
| 8,285,052 | B1 | 10/2012 | Bhattacharyya |
| 8,406,989 | B1 | 3/2013 | Bhattacharyya |
| 8,699,767 | B1 | 4/2014 | Khosla |
| 8,990,139 | B1 | 3/2015 | Howard |
| 9,002,762 | B1 | 4/2015 | Howard |
| 9,378,377 | B1 * | 6/2016 | Kuan .................... G06F 21/577 |
| 9,646,248 | B1 * | 5/2017 | Benvenuto ............. G06N 5/022 |
| 10,084,819 | B1 * | 9/2018 | Nogin ..................... H04L 63/20 |
| 10,360,506 | B2 * | 7/2019 | O'Brien |
| 2006/0212470 | A1 | 9/2006 | Zhang |
| 2013/0238622 | A1 | 9/2013 | Tang |
| 2014/0236548 | A1 * | 8/2014 | Conduit ................. G16C 20/50 703/2 |
| 2017/0316318 | A1 * | 11/2017 | O'Brien ................... G06N 5/04 |
| 2019/0230107 | A1 * | 7/2019 | De Sapio ............. G06F 21/552 |

OTHER PUBLICATIONS

Canter, B. & Wille, R. (1998).Formal Concept Analysis: Mathematical Foundations. Springer-Verlag, Chapter 1, pp. 16-62.
Carpineto, C. & Romano, G. (2004). Concept Data Analysis: Theory and Applications. Wiley, Chapter 2, pp. 25-77.
Carpineto, C. & Romano, G. (2004). Concept Data Analysis: Theory and Applications. Wiley, Chapter 3, pp. 83-104.
Endres, D., Foldiak, P., Priss, U. (2010), An application of formal concept analysis to semantic neural decoding. Annals of Mathematics and Artificial Intelligence 57(3-4), 233-248.
Endres, D., Adam, R., Giese, M.A. & Noppeney, U. (2012). Understanding the Semantic Structure of Human fMRI Brain Recording with Formal Concept Analysis. Formal Concept Analysis—10th International Conference, ICFCA 2012, Leuven, Belgium, May 7-10, 2012. Proceedings: 96-111.
Lotte, F., Congedo, M., Lécuyer, A., Lamarche, F., & Arnaldi, B. (2007). A review of classification algorithms for EEG-based brain-computer interfaces. Journal of neural engineering, 4.
Mourao-Miranda, J., Friston, K. J., & Brammer, M. (2007). Dynamic discrimination analysis: a spatial-temporal SVM. NeuroImage, 36(1), 88.
Naselaris, T., Kay, K. N., Nishimoto, S., & Gallant, J. L. (2011). Encoding and decoding in fMRI. Neuroimage, 56(2), 400-410.
Pereira, F., Detre, G., & Botvinick, M. (2011). Generating text from functional brain images. Frontiers in human neuroscience, 5.
Landauer, T.K., Foltz, P.W., & Lahm, D. (1998). Introduction to Latent Semantic Analysis. Discourse Processes, 25, 259-284.
Notice of Allowance for U.S. Appl. No. 14/489,313, dated Jan. 4, 2017.
G. Birkhoff. Lattice Theory, 3rd edition. Amer. Math Soc. Coll. Publ., 1973, Chapter 1.
Anderson, Michael L., and Tim Oates. "A critique of multi-voxel pattern analysis." In Proceedings of the 32nd Annual Meeting of the Cognitive Science Society, ed. S. Ohlsson and R. Catrambone, pp. 1511-1516. 2010.
J Ashburner and K Friston. Multimodal image coregistration and partitioning—A unified framework. Neuroimage, 6 (3): pp. 209-217, 1997.
John Ashburner and Karl J Friston. Unified segmentation. Neuroimage, 26 (3): pp. 839-851, 2005.
Brian Avants, Paramveer Dhillon, Benjamin Kandel, Philip Cook, Corey McMillan, Murray Grossman, and James Gee. Eigenanatomy improves detection power for longitudinal cortical change. Medical Image Computing and Computer-Assisted Intervention—MICCAI 2012, pp. 206-213, 2012.
Brian B Avants, CL Epstein, M Grossman, and James C Gee. Symmetric diffeomorphic image registration with cross-correlation: Evaluating automated labeling of elderly and neurodegenerative brain. Medical image analysis, 12 (1): pp. 26-41, 2008.
Brian B Avants, Philip A Cook, Lyle Ungar, James C Gee, and Murray Grossman. Dementia induces correlated reductions in white matter integrity and cortical thickness: a multivariate neuroimaging study with sparse canonical correlation analysis. NeuroImage, 50 (3): pp. 1004-1016, 2010.
Brian B Avants, Nicholas J Tustison, Gang Song, Philip A Cook, Arno Klein, and James C Gee. A reproducible evaluation of ants similarity metric performance in brain image registration. Neuroimage, 54 (3): pp. 2033-2044, 2011.
R Harald Baayen, Douglas J Davidson, and Douglas M Bates. Mixed-effects modeling with crossed random effects for subjects and items. Journal of memory and language, 59 (4): pp. 390-412, 2008.
L. W. Barsalou. Grounded cognition. Annual Review of Psychology, 59: pp. 617-645, 2008.
Douglas K Bemis and Liina Pylkkänen. Simple composition: A magnetoencephalography investigation into the comprehension of minimal linguistic phrases. The Journal of Neuroscience, 31 (8): pp. 2801-2814, 2011.
E. Bialystok and M. Viswanathan. Components of executive control with advantages for bilingual children in two cultures. Cognition, 112 (3): pp. 494-500, 2009.
J. R. Binder, R. H. Desai, W. W. Graves, and L. L. Conant. Where is the semantic system? a critical review and meta-analysis of 120 functional neuroimaging studies. Cerebral Cortex, 19 (12): pp. 2767-2796, 2009.
M F. Bonner and M. Grossman. Gray matter density of auditory association cortex relates to knowledge of sound concepts in primary progressive aphasia. The Journal of Neuroscience. 32 (23): pp. 7986-7991, 2012.
M. F. Bonner, J. E. Peelle, P. A. Cook, and M. Grossman. Heteromodal conceptual processing in the angular gyrus. NeuroImage, 71: pp. 175-186, 2013.
Michael F. Bonner and Amy R. Price. Where is the anterior temporal lobe and what does it do? The Journal of Neuroscience, 33 (10): pp. 4213-4215, 2013. doi: 10.1523/JNEUROSCI.0041-13.2013.
J. Brennan and L. Pyikkänen. Processing events: Behavioral and neuromagnetic correlates of aspectual coercion. Brain and Language, 106 (2): pp. 132-143, 2008.
J. Brennan and L. Pylkkänen. The time-course and spatial distribution of brain activity associated with sentence processing. NeuroImage 60 (2012), pp. 1139-1148.
C. Burgess. From simple associations to the building blocks of language: Modeling meaning in memory with the hal model. Behavior Research Methods, 30 (2): pp. 188-198, 1998.
A. Caramazza and J. R. Shelton. Domain-specific knowledge systems in the brain: The animate-inanimate distinction. Journal of cognitive neuroscience, 10 (1): pp. 1-34, 1998.
G. N. Carlson. Thematic roles and their role in semantic interpretation, Linguistics, 22 (3): pp. 259-280, 1984.
G. N. Carlson and M. K. Tanenhaus. Thematic roles and language comprehension. Syntax and semantics, 21: pp. 263-288, 1988.
C. Carpineto and G. Romano. Concept Data Analysis: Theory and Applications. Wiley, 2004, Chapter 2.
Valerie A Carr, Jesse Rissman, and Anthony D Wagner. Imaging the human medial temporal lobe with high- solution fmri. Neuron, 65 (3): pp. 298-308, 2010.
B. A. Colaianne and M. G. Powell. Developing transferrable geospatial skills in a liberal arts context. Journal of Geoscience Education, 69 (2): pp. 93-97, 2011.
B. A. Davey and H. A. Priestley, Introduction to lattices and order. Cambridge university press. 2002, Chapter 2.

(56) References Cited

OTHER PUBLICATIONS

B. A. Davey and H. A. Priestley. Introduction to lattices and order. Cambridge university press. 2002, Chapter 3.
F. Doshi, K. T. Miller, J. Van Gael, and Y. W. Teh. Variational inference for the indian buffet process. In Proceedings of the International Conference on Artificial Intelligence and Statistics, 2008, pp. 137-144.
D. Endres, P. Foldiak, and U. Priss. An application of formal concept analysis to semantic neural decoding. Annals of Mathematics and Artificial Intelligence, 57 (3): pp. 233-248, 2009.
D. Endres, R. Adam, M. Giese, and U. Noppeney. Understanding the semantic structure of human fMRI brain recordings with formal concept analysis. In In Proceedings of the 10th international conference on Formal Concept Analysis, pp. 96-111, 2012.
T. Fawcett. An introduction to ROC analysis. Pattern recognition letters, 27 (8): pp. 861-874, 2006.
David A Feinberg, Steen Moeller, Stephen M Smith, Edward Auerbach, Sudhir Ramanna, Matt F Glasser, Karla L Miller, Kamil Ugurbil, and Essa Yacoub. Multiplexed echo planar imaging for sub-second whole brain fmri and fast diffusion imaging. PLoS One, Dec. 2010, vol. 5, Issue 12, e15710, pp. 1-11.
C. Fellbaum. Wordnet: An electronic lexical database. A Bradford Book, 1998, Chapter 4.
Karl J Friston, John Ashburner, Christopher D Frith, J-B Poline, John D Heather, and Richard SJ Frackowiak. Spatial registration and normalization of images. Human brain mapping, 3 (3): pp. 165-189, 1995.
Bernhard Ganter, Rudolf Wille, and Rudolf Wille. Formal concept analysis. Springer Berlin, 1999, Chapter 1.
G. Garbin, S. Collina, and P. Tabossi. Argument structure and morphological factors in noun and verb processing: An fMRI study, PLOS ONE, Sep. 2012, vol. 7, Issue 9, e45091, pp. 1-7.
Robert Goldstone. An efficient method for obtaining similarity data. Behavior Research Methods, 26 (4): pp. 381-386, 1994.
Thomas L Griffiths and Zoubin Ghahramani. The Indian buffet process: An introduction and review. Journal of Machine Learning Research, 12: pp. 1185-1224, 2011.
M. Grossman, P. Koenig, C. DeVita, G. Glosser, D. Alsop, J. Detre, and J. Gee. Neural representation of verb meaning: an fMRI study. Human brain mapping, 15 (2): pp. 124-134, 2001.
M. Grossman, P. Koenig, C. DeVita, G. Glosser, D. Alsop, J. Detre, and J. Gee. The neural basis for category-specific knowledge: an fMRI study. NeuroImage, 15 (4): pp. 936-948, 2002.
M. Grossman, J. E. Peelle, E. E. Smith, C. T. McMillan, P. Cook, J. Powers, M. Dreyfuss, M. F. Bonner, L. Richmond, A. Boller, E. Camp, and L. Burkholder. Category-specific semantic memory: Converging evidence from BOLD fMRI and Alzheimer's disease. NeuroImage 68 (2013), pp. 263-274.
Todd M Gureckis and Bradley C Love. Direct associations or internal transformations? exploring the mechanisms underlying sequential learning behavior. Cognitive science, 34 (1): pp. 10-50, 2010.
Angela H Gutchess, Trey Hedden, Sarah Ketay, Arthur Aron, and John DE Gabrieli. Neural differences in the processing of semantic relationships across cultures. Social cognitive and affective neuroscience, 5 (2-3): pp. 254-263, 2010.
E. Halgren, R. P. Dhond, N. Christensen, C. Van Petten, K. Marinkovic, J. D. Lewine, and A. M. Dale. N400-like magnetoencephalography responses modulated by semantic context, word frequency, and lexical class in sentences. NeuroImage, 17 (3): pp. 1101-1116, 2002.
A R. Heise. Expressive order; Confirming sentiments in social actions. Springer, 2006, Chapter 2.
Alexander H. Huth, Shinji Nishimoto, An T. Vu, and Jack L. Gallant, A continuous semantic space describes the representation of thousands of object and action categories across the human brain. Neuron, 76: pp. 1210-1224, 2012.

P. Indefrey. A meta-analysis of hernodynamic studies on first and second language processing: Which suggested differences can we trust and what do they mean? Language Learning, 56 (s1): pp. 279-304, 2006.
D. Kemmerer, J. G. Castillo, T. Talavage, S. Patterson, and C. Wiley. Neuroanatomical distribution of five semantic components of verbs: Evidence from fMRI. Brain and language, 107 (1): pp. 16-43, 2008.
P. Koenig and M. Grossman. Neural basis of semantic memory, chapter Process and content in semantic memory, pp. 247-264. Cambridge University Press, 2007.
Z. Kourtzi and N. Kanwisher. Activation in human mt/mst by static images with implied motion. Journal of cognitive neuroscience. 12 (1): pp. 48-55, 2000.
K. Bache and M. Lichman. UCI machine learning repository. University of California, Irvine, School of Information and Computer Sciences, 2013, available at h t p : / / archive.ics.uci.edu/ml/datasets/Iris taken on May 5, 2015.
G. Romano C. Carpineto. Concept Data Analysis: Theory and Applications. Wiley, 2004, Chapter 2.
B. Ganter and R. Wille. Formal Concept Analysis: Mathematical Foundations. Springer-Verlag, Chapter 1, 1998.
Stephanie Guillas, Karell Bertet, and Jean-Marc Ogier. A generic description of the concept lattices' classifier: application to symbol recognition. In GREC: IAPR International Workshop on Graphics Recognition, 2005, pp. 47-60.
Stephanie Guillas, Karell Bertet, and Jean-Marc Ogier. Concept lattice classifier: a first step towards an iterative process of recognition of noised graphic objects. In CLA: Concept Lattices and Their Applications, No. section 2, pp. 257-263, 2006.
Olga Prokasheva, Alina Onishchenko, and Sergey Gurov. Classification Methods Based on Formal Concept Analysis. In FDAIR: Formal Concept Analysis Meets Information Retrieval, pp. 95-104, 2013.
M. Swain, S. K. Dash, S. Dash, and A. Mohapatra. An approach for IRIS plant classification using neural network. International Journal of Soft Computing, 2012, pp. 79-89.
International Search Report of the International Searching Authority for PCT/US2015/041744; dated May 25, 2016.
The Written Opinion of the International Searching Authority for PCT/US2015/041744; dated May 25, 2016.
Notification of Transmittal of International Search Report and the Written Opinion of the International Searching Authority for PCT/US2015/041744; dated May 25, 2016.
Olga Prokasheva et al., 'Classification Methods Based on Formal Concept Analysis', In: Workshop co-located with the 35th European Conference on Information Retrieval (ECIR 2013), Mar. 24, 2013, pp. 95-103.
Preliminary Amendment for U.S. Appl. No. 14/807,083, dated Sep. 2, 2016.
Martin Maechler and Douglas Bates, "2nd Introduction to the Matrix package," https://cran.r-project.org/web/packages/Matrix/vignettes/Intro2Matrix.pdf , Sep. 2006, pp. 1-9.
Huth, A. G., Nishimoto, S., Vu, A. T., & Gallant, J. K. (2012). A continuous semantic space describes the representation of thousands of object and action categories across the human brain. Neuron, 76(6), pp. 1210-1224.
Mitchell, T. M., Shinkareva, S. V., Carlson, A., Chang, K.-M., Malave, V. L., Mason, R. A., & Just, M. A. (2008). Predicting human brain activity associated with the meanings of nouns. Science, 320(5880), pp. 1191-1195.
Brice A Kuhl, Jesse Rissman, and Anthony D Wagner. Multi-voxel patterns of visual category representation during episodic encoding are predictive of subsequent memory. Neuropsychologia, 50 (4): pp. 458-469, 2012.
G. R. Kuperberg, D. A. Kreher, T. Sitnikova, D. N. Caplan, and P. J. Holcomb. The role of animacy and thematic relationships in processing active english sentences: Evidence from event-related potentials. Brain and Language, 100 (3): pp. 223-237, 2007.
M Kutas and S. A. Hillyard. Brain potentials during reading reflect word expectancy and semantic association. Nature, 307 (5947): pp. 161-163, 1984.

(56) References Cited

OTHER PUBLICATIONS

T. Landauer and S. Dumais. A solution to Plato's problem: the latent semantic analysis theory of acquisition, induction, and representation of knowledge. Psychological Review, 104: pp. 211-240, 1997.
Benjamin J Levy and Anthony D Wagner. Measuring memory reactivation with functional mri implications for psychological theory. Perspectives on Psychological Science. 8 (1): pp. 72-78, 2013.
I. Levy. U. Hasson, G. Avidan T. Hendler, and R. Malach. Center-periphery organization of human object areas. Nature neuroscience, 4 (5): pp. 533-539, 2001.
R. Levy. Expectation-based syntactic comprehension. Cognition, 106 (3): pp. 1126-1177, 2008.
Jackson C Liang, Anthony D Wagner, and Alison R Preston. Content representation in the human medial temporal lobe. Cerebral Cortex Jan. 2013; 23: pp. 80-96, doi:10.1093/cercor/bhr379, (Advance Access publication Jan. 23, 2012).
T. Linzen., A. Marantz, and L Pyikkänen. Syntactic context effects in visual word recognition: An MEG study, 2013, pp. 117-139.
Hugo Lövheim. A new three-dimensional model for emotions and monoamine neurotransmitters. Medical Hypotheses 78 (2012), pp. 341-348.
B. Z. Mahon and A. Caramazza. Concepts and categories: a cognitive neuropsychological perspective. Annual review of psychology, 2009 ; 60: pp. 27-51. doi.10.1146/annurev.psych.60.110707. 163532.
Markant, Doug, and Todd M. Gureckis. "Does the utility of information influence sampling behavior." In Proceedings of the 34th annual conference of the cognitive science society, pp. 719-724, 2012.
A. Martin. The representation of object concepts in the brain. Annual review of psychology, 58: pp. 25-45, 2007.
McDonnell, John V., Carol A. Jew, and Todd M. Gureckis. "Sparse category tabels obstruct generalization of category membership." In Proceedings of the 34th annual conference of the cognitive science society, pp. 749-754, 2012.
Geoffrey McLachlan and David Peel. Finite mixture models, vol. 299. Wiley Interscience, 2000, Chapter 2.
G. A. Miller and C. Fellbaum. Semantic networks of english. Cognition, 41 (1): pp. 197-229, 1991.
Tom M Mitchell, Svetlana V Shinkareva, Andrew Carlson, Kai-Min Chang, Vicente L Malave, Robert A Mason, and Marcel Adam Just. Predicting human brain activity associated with the meanings of nouns. science, 320 (5880): pp. 1191-1195, 2008.
Martin M Monti. Statistical analysts of fMRI time-series: a critical review of the GLM approach. Frontiers in Human Neuroscience, vol. 5, Article 28, 2011, pp. 1-13.
C. E. Osgood, G. J. Suci, and P. Tannenbaum, The measurement of meaning. University of Illinois Press. 1967, Chapter 1.
K. Pammer, P. C. Hansen, M. L. Kringelbach, I. Holliday, G. Barnes, A. Hiliebrand, K. D. Singh, and P. L. Cornelissen. Visual word recognition: the first half second. NeuroImage, 22 (4): pp. 1819-1825, 2004.
A. Parbery-Clark, S. Anderson, E. Hittner, and N. Kraus. Musical experience strengthens the neural representation of sounds important for communication in middle-aged adults. Frontiers in aging neuroscience, vol. 4, Article 30, Nov. 2012, pp. 1-12.
K. Patterson, P. J. Nestor, and T. T. Rogers. Where do you know what you know? the representation of semantic knowledge in the human brain, Nature Reviews Neuroscience, 8 (12): pp. 976-987, 2007.
Francisco Pereira, Greg Detre, and Matthew Botvinick. Generating text from functional brain images. Frontiers in Human Neuroscience, vol. 5, Article 72, Aug. 2011, pp. 1-11.
Russell A Poldrack, Jeanette A Mumford, and Thomas E Nichols. Handbook of functional mri data analysis. Cambridge University Press, 2011, Appendix A, pp. 191-200.
F. Pulvermüller and O. Hauk. Category-specific conceptual processing of color and form in left fronto-temporal cortex. Cerebral Cortex, 16 (8): pp. 1193-1201, 2006.

L. Pylkkänen and B. McElree. An MEG study of silent meaning. Journal of Cognitive Neuroscience, 19 (11): pp. 1905-1921, 2007.
L. Pylkkänen, A. E. Martin, B. McElree, and A. Smart. The anterior midline field: Coercion or decision making? Brain and Language, 108 (3): pp. 184-190, 2009.
Liina Pylkkänen. Introducing arguments, vol. 49. MIT Press, 2008, Chapter 1.
Liina Pylkkänen, Rodolfo Llinàs, and Gregory L Murphy. The representation of polysemy: MEG evidence. Journal of Cognitive Neuroscience, 18 (1): pp. 97-109, 2006.
Jesse Rissman, Henry T Greely, and Anthony D Wagner. Detecting individual memories through the neural decoding of memory states and past experience. Proceedings of the National Academy of Sciences, 107 (21): pp. 9849-9854, 2010.
D. C. Rubin. 51 properties of 125 words: A unit analysis of verbal behavior. Journal of Verbal Learning and Verbal Behavior, 19 (6): pp. 736-755, 1980.
James A Russell. A circumplex model of affect. Journal of personality and social psychology, 39 (6): pp. 1161-1178, 1980.
A. V. Samsonovich. A metric scale for 'abstractness' of the word meaning. In Workshops at the Twenty-Sixth AAAI Conference on Artificial Intelligence, 2012, pp. 48-52.
A. V. Samsonovich and G. A. Ascoli. A simple neural network model of the hippocampus suggesting its pathfinding role in episodic memory retrieval. Learn Mem, 12 (2): pp. 193-208, 2005, NIH R01 NS39600/NS/United States NINDS Journal Article Research Support, N.I.H., Extramural Research Support, U.S. Gov't, Non-P. H.S. Research Support, U.S. Gov't, P.H.S. United States.
A. V. Samsonovich and G. A. Ascoli, Advances in Artificial General Intelligence: Concepts, Architectures and Algorithms, chapter Cognitive Map Dimensions of the Human Value System Extracted from Natural Language, pp. 111-124. IOS Press, 2007.
A. V. Samsonovich and G. A. Ascoli. Computing semantics of preference with a semantic cognitive map of natural language: Application to mood sensing from text. In 2006 Multidisciplinary Workshop on Advances in Preference Handling, 2008, pp. 91-96.
A. V. Samsonovich and G. A. Ascoli. Principal semantic components of language and the measurement of meaning. PloS one, vol. 5, Issue 6: pp. e10921.1-e10921.17, Jun. 2010.
Samsonovich, Alexei V., and Colin P. Sherrill. "Comparative study of self-organizing semantic cognitive maps derived from natural language," In Proceedings of the 29th Annual Cognitive Science Society, p. 1848. Cognitive Science Society, 2007.
A.V. Samsonovich and G.A. Ascoli. Augmenting weak semantic cognitive maps with an 'abstractness' dimension. Computational Intelligence and Neuroscience. vol. 2013 (2013), Article ID 308176, pp. 1-10.
P. Schwenkreis, S. El Tom, P. Ragert, B. Pleger, M. Tegenthoff, and H. R. Dinse. Assessment of sensorimotor cortical representation asymmetries and motor skills in violin players. European Journal of Neuroscience. 26 (11): pp. 3291-3302, 2007.
93. R. Sebastian, A. R. Laird, and S. Kiran. Meta-analysis of the neural representation of first language and second language. Applied Psycholinguistics 32 (2011), pp. 799-819.
ML Seghier, F Kherif F, G Josse, and CJ Prince. Regional and hemispheric determinants of language laterality: implications for preoperative fMRI. Huma Brain Mapping, 32: pp. 1602-1614, 2011.
K. A. Shapiro, F. M. Mottaghy, N. O. Schiller, T. D. Poeppel, M. O. Flüß, H-W Müller, A. Garamazza, and B. J. Krause. Dissociating neural correlates for nouns and verbs. Neuroimage, 24 (4): pp. 1058-1067, 2005.
Svetlana V Shinkareva, Robert A Mason, Vicente L Malave, Wei Wang, Tom M Mitchell, and Marcel Adam Just. Using fmri brain activation to identify cognitive states associated with perception of tools and dwellings. PLoS One,Jan. 2008, Issue 1, e1394, pp. 1-9.
Svetlana V Shinkareva, Vincente L Malave, Robert A Mason, Tom M Mitchell, and Marcel Adam Just. Commonality of neural representations of words and pictures. Neuroimage, 54: pp. 2418-2425, 2011. El.
Svetlana V Shinkareva, Vicente L Malave, Marcel Adam Just, and Tom M Mitchell. Exploring commonalities across participants in the neural representation of objects. Human Brain Maping, 33: pp. 1375-1383, 2012.

(56) References Cited

OTHER PUBLICATIONS

W. K. Simmons, V. Ramjee, Beauchamp, K McRae, A. Martin, and L. W. Barsalou. A common neural substrate for perceiving and knowing about color, Neuropsychologia, 45 (12): pp. 2802-2810, 2007.
Olaf Sporns. Network attributes for segregation and integration in the human brain. Current Opinion in Neurobiology 2013, 23: pp. 162-171.
E. Vul, D. Lashkari, P. J. Hsieh, P. Golland, and N. Kanwisher. Data-driven functional clustering reveals dominance of face, place, and body selectivity in the ventral visual pathway. Journal of Neurophysiology, 108 (8): pp. 2306-2322, Oct. 2012.
Edward Vul, Christine Harris, Piotr Winkielman, and Harold Pashler. Puzzlingly high correlations in fmri studies of emotion, personality, and social cognition. Perspectives on Psychological Science, 4 (3): pp. 274-290, 2009.
M. Westerlund and L. Pylkkänen. Characterizing the role of the left anterior temporal lobe in combinatory processes. The Society for the Neurobiology of Language Abstracts, 2011, p. 138.
Essa Yacoub, Amir Shmuel, Josef Pfeuffer, Van De Moortele, Gregor Adríany, Peter Andersen, J Thomas Vaughan, Hellmut Merkle, Kamil Ugurbil, Xiaoping Hu, et al. Imaging brain function in humans at 7 tesla. Magnetic Resonance in Medicine, 45 (4): pp. 588-594, 2001.
Essa Yacoub, Timothy Q Duong, Van De Moortele, Martin Lindquist, Gregor Adriany, Seong-Gi Kim, Kāmil Ugurbil, Xiaoping Hu, et al. Spin-echo fmri in humans using high spatial resolutions and high magnetic fields. Magnetic resonance in medicine, 49 (4): pp. 655-664, 2003.
Essa Yacoub, Noam Harel, and Kāmil Ugurbil, High-field fmri unveils orientation columns in humans. Proceedings of the National Academy of Sciences, 105 (30): pp. 10607-10612, 2008.
Wille. Ordered Sets, chapter Restructuring Lattice Theory: an approached based on hierarchies of concepts, pp. 445-470. Reidel, Dordrecht-Boston, 1982.
Murphy B. Chang, K.M. and M.A. Just. A latent feature analysis of the neural representation of conceptual knowledge. In Proceedings of the 2012 Conference of the North American Chapter of the Association for Computational Linguistics: Human Language Technologies, Montreal, Canada, pp. 377-381., 2012.
Todd M Gureckis and Bradley C Love. Bridging levels: Using a cognitive model to connect brain and behavior in category learning. In Proceedings of the 28th Annual Meeting of the Cognitive Science Society, pp. 315-320, 2006.
Bradley C Love and Todd M Gureckis, Models in search of a brain. Cognitive, Affective, & Behavioral Neuroscience, 7 (2): pp. 90-108, 2007.
Bradley C Love, Douglas L Medin, and Todd M Gureckis. Sustain: a network model of category learning. Psychological review, 2004, vol. 111, No. 2, pp. 309-332.
William D. Penny, Karl J. Friston, John T. Ashburner, Stefan J. Kiebel, and Thomas E. Nichols, editors. Statistical Parametric Mapping: The Analysis of Functional Brain Images. Academic Press, 2007, Chapter 8.
Martin Havlicek, Karl J Friston, Jiri Jan, Milan Brazdil, and Vince D Calhoun. Dynamic modeling of neuronal responses in fmri using cubature kalman filtering. NeuroImage 56 (2011), pp. 2109-2128.
Johanna M Zumer, Matthew J Brookes, Claire M Stevenson, Susan T Francis, and Peter G Morris. Relating bold fmri and neural oscillations through convolution and optimal linear weighting. NeuroImage, 49(2): pp. 1479-1489, 2010.
Fikret Isk Karahanoglu, Cesar Gaudes Caballero, François Lazeyras, and Dimitri Van De Ville. Total activation: Fmri deconvolution through spatio-temporal regularization, NeuroImage 73 (2013), pp. 121-134.
C. C. Gaudes,, F. I. Karahanoglu, F. Lazeyras, and D. Van De Ville. Structured sparse deconvolution for paradigm free mapping of functional mri data, In Biomedical Imaging (ISBI), 2012 9th IEEE International Symposium on, pp. 322-325. IEEE, 2012.
Kangjoo Lee, Sungho Tak, and Jong Chul Ye. A data-driven sparse GLM for fMRI analysis using sparse dictionary learning with mdl criterion. Medical Imaging, IEEE Transactions on, 30(5): pp. 1076-1089, 2011.
Härdle, Wolfgang; Simar, Léopold, "Canonical Correlation Analysis," Applied Multivariate Statistical Analysis, pp. 321-330, 2007.

\* cited by examiner

| Innovation | Benefit |
|---|---|
| A neuroceptual lattice has been shown in experimental studies to map neural data to semantic data by coupling functional clustering with latent feature extraction for neural data | Data driven discovery of neural features underlying concept representations. Used to discover, verify and assess a novel meta-theory of concept representations in the brain |
| Heteromodal Association Areas are network hubs | Quantify a combination of previously qualitative spatiotemporal representation schemes |
| Personalized Semantic Map | Language independent semantic relationships are personalized to improve interpretation and prediction |
| Interactive experimental design samples conceptual space adaptively, guided by the neuroceptual lattice | Maximizes differences in neural features between concepts for optimization of interpretation and prediction performance. |
| Novel pulse sequences for 3,7 and 10.5T fMRI, novel temporal feature extraction from fMRI and fusion with MEG | Acquire neural representations of conceptual knowledge with high spatial and temporal resolutions |

FIG. 9

| Cohort | Theoretical Justification | Theoretical Predictions |
|---|---|---|
| Musicians | Lateralized sensory-motor concept representations (Lit. Ref. Nos. 73, 92) | Increased lateralization of neural concept representations; Hubs are localized laterally; Greater representation of sensory-motor regions in hubs |
| Quantitative Majors | Geologists, physicists and visual artists have shown visually dominated behavioral preference in spatial reasoning (Lit. Ref. No. 27) | Increased visuospatial features in neural concept representations; Hubs recruit strongly distributed representations from visual areas |
| Multilingual (ESL) | Greater mental flexibility & executive resources (Lit. Ref. Nos. 14, 48, 93). | Greater mental flexibility in the interpretation of conceptual knowledge; more immune to contextual modulation; more network hubs in executive regions. |

FIG. 11

| Contextual Modulation | Theoretical Justification of Contextual Dimension | Theoretical Predictions |
|---|---|---|
| Semantic In/Congruence & Predictability | Congruence and predictability are robust contextual factors affecting lexical and semantic access as well as suprisal (Lit. Ref. Nos. 54, 58). | Different network hubs are engaged for incongruent/congruent sentences |
| Property Emphasis & Thematic role | The thematic role emphasizes concept properties between an event and an event participant; (Lit. Ref. Nos. 23, 24, 53). | Different network hubs are engaged for events and participants |
| Conceptual access | High LIFG activity reflects selection processes after conceptual access which is sensitive to the semantic congruence of the concept within its sentential context (Lit. Ref. Nos. 45, 72, 79). | Hubs within the LIFG are engaged for incongruent/congruent sentences |
| Grammatical Role | Left inferior frontal cortex has been implicated in the grammatical role (e.g., subject vs. object) of concept representations (Lit Ref. 37) | Separate subject/object hubs are engaged within the left inferior frontal cortex |
| Explicit/Implicit | The vmPFC has been implicated in implicit vs. explicit contextual modulation (Lit. Ref. Nos.19, 78, 79). | Hubs in vmPFC: Implicit (author began the book), implies writing, and object reference (the wedding started, implies bride & groom) |
| Adjectival Modification | LATL activity is, known to vary by adjectival modification (flower vs. red flower) (Lit Ref. No.104). | LATL hubs are refined categorically by adjectives |

FIG. 13

| Innovation | Description |
|---|---|
| | Using the sparsity prior in Compressed Sensing (CS), the problems of using a rigid model that does not adjust to individual or experimental variations is avoided. Two key methods have never been combined: |
| Learning HRFs using group-sparsity | 1) Group-sparsity based CS reconstruction of fMRI (Lit. Ref. Nos. 117, 118). takes advantage of voxel correlations by using the K-SVD method<br>2) Determine the sparse dictionary GLM instead of an explicit HRF model (Lit Ref. No. 119). |
| | MEG and fMRI experiments in KRNS-MEANING determines the cross-correlation between events in the two modalities and inform HRF estimation (Lit Ref. No. 116). |

FIG. 14

| Innovation | Description |
|---|---|
| SCCAN<br><br>Sparse Canonical Correlation Analysis for Neuroimaging | Relate BOLD fMRI & MEG data acquired via the same semantic task design by employing prior-constrained SCCAN. SCCAN requires 1/2 dimensions of the data to be aligned (spatial or temporal priors). Employ band-pass filters and sinc interpolation to simulate alignment over the temporal dimensions in order to estimate "super-resolution" in the fMRI temporal domain. Maximize the mutual information between the spatial locality shared across two modalities by allowing the sparse canonical variates to extract the spatial signal from the fMRI data most related to specific spatial regions of the MEG signal. Spatial templates for MEG from Lit. Ref. No. 13 & gain anatomical coordinates using anatomical scans and a multi-atlas label fusion. Significance of different MEG/fMRI variates by permutation testing. |
| fMRI Pulse Sequences for fast acquisition & physiological noise rejection | Multiplexed Echo-planar imaging (m-EPI) pulse sequence achieves 400 ms TR (whole brain volume acquisition) for 3T with 3mm isotropic voxels (Lit. Ref. 33). The literature has developed MB sequences that achieve 2-2.5mm resolution with 1-1.5 sec TR for 3T. 1-1.5mm resolution with 1.5-2.5 sec for 7T, and newest results achieve 200ms TR for 3T. |
| Fast, GPU-based volume reconstructions | Currently, reconstruction on a 3T Siemens Trios takes ~368 s, or 2.4x longer than the scan time (for a standard full brain scan: TR=0.7s, MB=8, 72 slices, 90x104 in plain, 32-channel coil, ~153s scan time). Using the innovative GPU-based volume reconstruction method this goes to 90s (or faster than the scan time, removing the bottle neck). |
| ANT<br><br>Advanced Normalization Tools | Registration tool ANT finished first overall in three different competitions that test the reliability, reproducibility and accuracy of our image registration and segmentation methods |

FIG. 16

| Experiment | Analysis Techniques |
|---|---|
| Behavioral Exam and Cognitive Model | • Statistical analyses (ANOVA, t-test, etc...) assess cohort differences in semantic judgments<br>  ○ Subject's judgments of semantic relatedness integrated in personalized semantic models<br>• Multi-variate data & model analyses: Multi-Dimensional Scaling (MDS)<br>  • Uses pairwise similarities to construct a geometric representation of concept similarities.<br>  • Comparisons of concept relatedness identifies systematic individual differences. |
| fMRI | • Individual subject activation patterns are analyzed by an eigenanatomy algorithm:<br>  ○ Approximates an eigendecomposition into neural basis functions (Lit. Ref. No. 6), using:<br>  ○ Non-negative matrix factorization, sparse PCA, & SVD<br>  ○ The neural voxel space is decomposed into meaningful anatomical clusters<br>  ○ Eigenanatomy vectors serves as basis function for cross-subject comparisons<br>  ○ Machine learning techniques (FCA, IBP) use the eigenanatomy vectors as neural features |
| Neuroceptual Lattice | • Neuroceptual Lattice Measures for comparing structure between individuals and cohorts include:<br>  ○ Numbers of nodes within the lattice, Internode distance matrices, & Lattice Isomorphism |

FIG. 17

METHOD AND SYSTEM TO PREDICT AND INTERPRET CONCEPTUAL KNOWLEDGE IN THE BRAIN

CROSS-REFERENCE TO RELATED APPLICATIONS

This is a Continuation-in-Part application of U.S. Non-Provisional application Ser. No. 14/489,313, filed in the United States on Sep. 17, 2014, entitled, "Mapping Across Domains to Extract Conceptual Knowledge Representation from Neural Systems," which is a Non-Provisional patent application of U.S. Provisional Application No. 62/028,083, filed in the United States on Jul. 23, 2014, entitled, "Mapping Across Domains to Extract Conceptual Knowledge Representation from Neural Systems," which are incorporated herein by reference in their entirety.

This is ALSO a Continuation-in-Part application of U.S. Non-Provisional application Ser. No. 14/807,083, filed in the United States on Jul. 23, 2015, entitled, "A General Formal Concept Analysis (FCA) Framework for Classification," which is a Continuation-in-Part Application of U.S. Non-Provisional application Ser. No. 14/489,313, filed in the United States on Sep. 17, 2014, entitled, "Mapping Across Domains to Extract Conceptual Knowledge Representation from Neural Systems," which are incorporated herein by reference in their entirety. U.S. Non-Provisional application Ser. No. 14/807,083 is also a Non-Provisional Application of U.S. Provisional Application No. 62/028,171, filed in the United States on Jul. 23, 2014, entitled, "A General Formal Concept Analysis (FCA) Framework for Classification," which is incorporated herein by reference in its entirety.

This is ALSO a Non-Provisional patent application of U.S. Provisional Application No. 62/095,574, filed in the United States on Dec. 22, 2014, entitled, "Method and System to Predict and Interpret Conceptual Knowledge in the Brain," the entirety of which are hereby incorporated by reference as though fully set forth herein.

BACKGROUND OF INVENTION

(1) Field of Invention

The present invention relates to a system for predicting and interpreting conceptual knowledge in the brain and, more particularly, to a system for predicting and interpreting conceptual knowledge in the brain that incorporates hierarchical structure and temporal information.

(2) Description of Related Art

Perceptual and motor functions have been well studied in the neuroscience community. A neuroscientific understanding of abstract knowledge, such as semantic concepts, however, remains relatively nascent. Neuroscience studies of concepts often examine only a small number of broad categories (e.g., living vs. non-living (see the List of Incorporated Literature References, Literature Reference No. 22) and localize them in the brain using (more or less) static imaging techniques such as positron emission tomography (PET) or functional magnetic resonance imaging (fMRI). These experiments are typically concerned with nouns and, hence, do not study verbs or modifiers (e.g., "yellow, "in the morning", etc.), let alone the compositionality of concepts (see Literature Reference No. 20). Additionally, these experiments reflect the lack of a quantitative and predictive theory that could cover a large class of concepts and how they can be contextually modulated through time.

Brain decoding and prediction of conceptual knowledge typically usually uses direct decoding (see, for example, Literature Reference Nos. 2, 47, 70, and 75). Although this has yielded impressive results, it is not theory driven and, hence, has difficulty generalizing to new concepts. Additionally, it may neglect or even overrule important anatomical constraints. Attempts to model conceptual similarity using ontologies—whether hand-coded (see Literature Reference No. 34) or statistically derived (see Literature Reference No. 55)—often neglect crucial differences, such as valence. Removing such factors disembodies concepts from neural constraints (see Literature Reference No. 11).

Linguistic representations and semantic judgments often vary from person to person and group to group with examples such as language lateralization (see Literature Reference No. 94) and cultural background (see Literature Reference No. 44), respectively. However, these differences are typically ignored, limiting generalization to new subjects. Similarly, concepts can take on different meaning in different contexts (e.g., aspectual coercion (see Literature Reference No. 19) or polysemy (see Literature Reference No. 81)), but the state-of-the-art in concept representation studies typically presents concepts in isolation.

Thus, a continuing need exists for a system which can quantify concepts along multiple dimensions and can generalize to novel concepts.

SUMMARY OF THE INVENTION

The present invention relates to a system for predicting and interpreting conceptual knowledge in the brain and, more particularly, to a system for predicting and interpreting conceptual knowledge in the brain that incorporates hierarchical structure and temporal information. A neuroceptual lattice comprising a plurality of nodes representing attributes is created by aligning the set of semantic features and the set of neural features. Structures in the neuroceptual lattice are identified to quantify an extent to which the set of neural features represents a target concept. The identified structures in the neuroceptual lattice are used to determine what concept a test subject is thinking about based on a sensor reading.

In another aspect, a semantic model is developed, and at least one behavioral exam is performed to assess a calibration subject into at least one cohort and reveal semantic relationships to modify a personalized semantic space developed by the semantic model. A set of semantic features are extracted from the personalized semantic space, and a set of neural features are extracted from neuroimaging of the calibration subject.

In another aspect, lattice distance between at least two nodes in the neuroceptual lattice is used to rank a set of target concepts to quantify the extent to which the set of neural features represents the target concept, such that as lattice distance increases, concept similarity decreases, and as lattice distance decreases, concept similarity increases.

In another aspect, a neural lattice and a semantic lattice are aligned to create the neuroceptual lattice. Adaptive neuroimaging is used to analyze the neuroceptual lattice to improve alignment between the neural lattice and the semantic lattice.

In another aspect, a set of semantic information is processed and semantic relationships are extracted from the set of semantic information. The semantic relationships are used to generate the semantic model. An input sentence is parsed, and a meaning of each word in the sentence is extracted. The semantic model is used to identify at least one word in the sentence to identify a relevant semantic attribute which is then used to locate at least one node in the semantic lattice. The neuroceptual lattice is used to identify at least one neural attribute corresponding to the at least one node in the semantic lattice.

In another aspect, an ordered list of likely target concepts of which the human subject is thinking is generated. Given a target concept, a likely neural activity pattern corresponding to the target concept in the human subject is determined.

In another aspect, target concepts are quantified along multiple contextual dimensions, and novel target concepts are mapped into the neuroceptual lattice.

In another aspect, the present invention also comprises a method for causing a processor to perform the operations described herein and performing the listed operations.

Finally, in yet another aspect, the present invention also comprises a computer program product comprising computer-readable instructions stored on a non-transitory computer-readable medium that are executable by a computer having a processor for causing the processor to perform the operations described herein.

BRIEF DESCRIPTION OF THE DRAWINGS

The objects, features and advantages of the present invention will be apparent from the following detailed descriptions of the various aspects of the invention in conjunction with reference to the following drawings, where:

FIG. 9 is a table illustrating innovations and benefits of the system according to various embodiments of the present invention;

FIG. 11 is a table illustrating the justification and predictions of human behavioral cohorts according to various embodiments of the present invention;

FIG. 13 is a table illustrating the justification and predictions of the major dimensions of contextual modulation according to various embodiments of the present invention;

FIG. 14 is a table illustrating innovations for temporal feature extraction according to various embodiments of the present invention;

FIG. 16 is a table illustrating fMRI innovations according to various embodiments of the present invention;

FIG. 17 is a table illustrating cohort and individual analysis methods used to personalize generic models according to various embodiments of the present invention.

DETAILED DESCRIPTION

Figure 1:
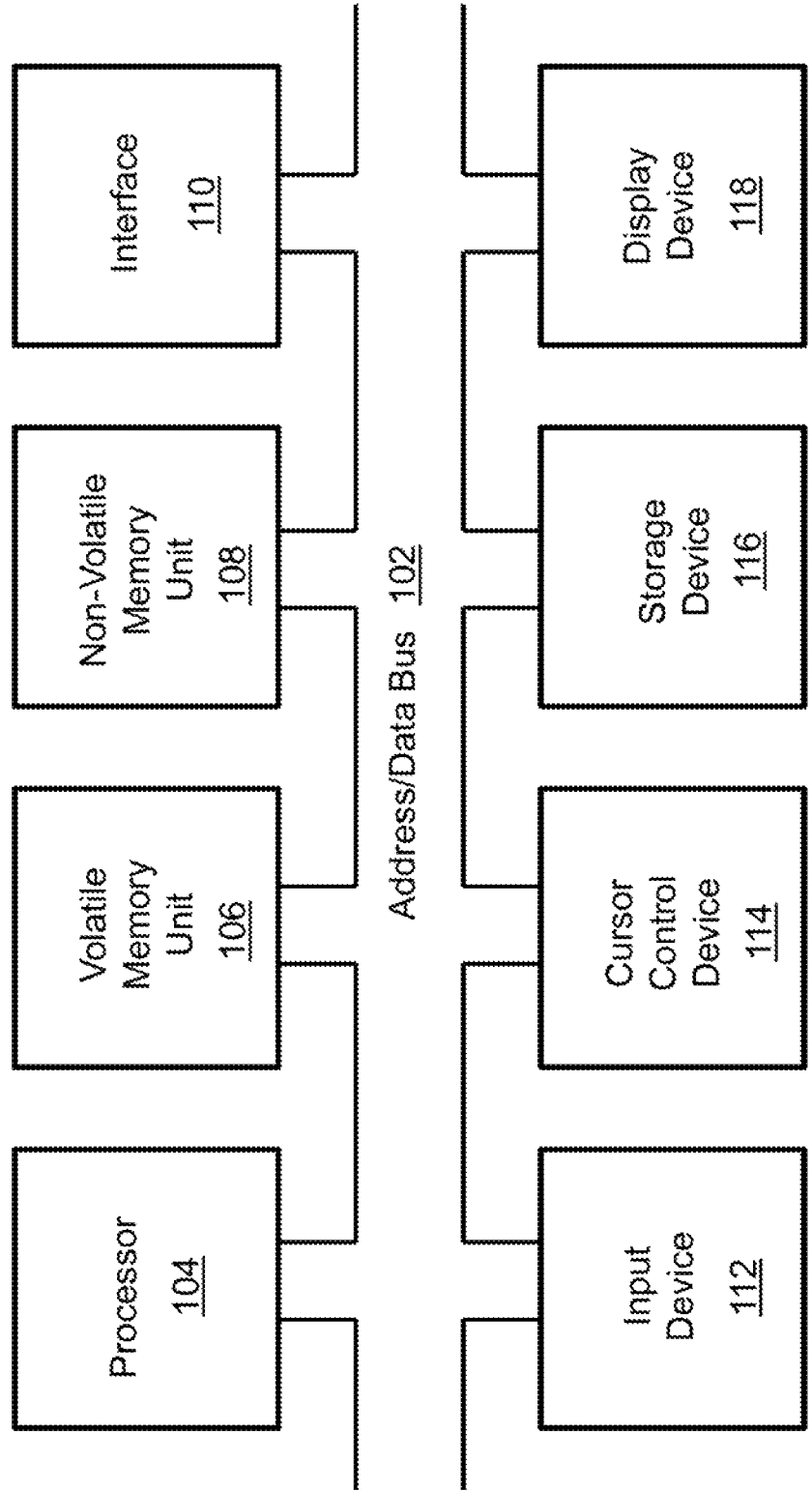
FIG. 1 is a block diagram depicting the components of a system for predicting and interpreting conceptual knowledge in the brain according to various embodiments of the present invention.

The present invention relates to a system for predicting and interpreting conceptual knowledge in the brain and, more particularly, to a system for predicting and interpreting conceptual knowledge in the brain that incorporates hierarchical structure and temporal information. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter-clockwise have been used for convenience purposes only and are not intended to imply any particular fixed direction. Instead, they are used to reflect relative locations and/or directions between various portions of an object. As such, as the present invention is changed, the above labels may change their orientation.

Before describing the invention in detail, first a list of incorporated literature references as used in the description is provided. Next, a description of various principal aspects of the present invention is provided. Following that is an introduction that provides an overview of the present invention. Finally, specific details of the present invention are provided to give an understanding of the specific aspects.

(1) LIST OF INCORPORATED LITERATURE REFERENCES AND U.S. PATENT REFERENCES

The following references are incorporated and cited throughout this application. For clarity and convenience, the references are listed herein as a central resource for the reader. The following references are hereby incorporated by reference as though fully included herein. The references are cited in the application by referring to the corresponding literature reference number, as follows:

1. G. Birkhoff, Lattice Theory, 3rd edition, Amer. Math Soc. Coll. Publ., Chapter 1, 1973.
2. M. L. Anderson and T. Oates, "A critique of multi-voxel pattern analysis," In Proceedings of the 32nd Annual Conference of the Cognitive Science Society, 2010.
3. G. A. Ascoli and A. V. Samsonovich, U.S. Patent Publication No. 2010/0042401, "Semantic cognitive map," 2012.
4. J. Ashburner and K. Friston, "Multimodal image coregistration and partitioning—A unified framework. Neuroimage," 6 (3): 209-217, 1997.
5. J. Ashburner and K. J. Friston, "Unified segmentation," Neuroimage, 26 (3): 839-851, 2005.
6. B. Avants, et al., "Eigenanatomy improves detection power for longitudinal cortical change," Medical Image Computing and Computer-Assisted Intervention—MICCAI 2012, pages 206-213, 2012.
7. B. B. Avants, C. L. Epstein, M. Grossman, and J. C. Gee, "Symmetric diffeomorphic image registration with cross-correlation: Evaluating automated labeling of elderly and neurodegenerative brain," Medical image analysis, 12 (1): 26-41, 2008.
8. B. B. Avants, et al., "Dementia induces correlated reductions in white matter integrity and cortical thickness: a multivariate neuroimaging study with sparse canonical correlation analysis," NeuroImage, 50 (3): 1004-1016, 2010.
9. B. B. Avants, et al., "A reproducible evaluation of ants similarity metric performance in brain image registration," Neuroimage, 54 (3): 2033-2044, 2011.
10. R. H. Baayen, D. J. Davidson, and D. M. Bates, "Mixed-effects modeling with crossed random effects for subjects and items," Journal of Memory and Language, 59 (4): 390-412, 2008.
11. L. W. Barsalou, "Grounded cognition, "Annual Review of Psychology, 59: 617-645, 2008.
12. D. Bates and M. Maechler, "matrix: A matrix package for r. R package version 0.99875-2", available at http://CRAN.R-project.org, 15, 2007.
13. D. K. Bemis and L. Pylkkänen, "Simple composition: A magnetoencephalography investigation into the comprehension of minimal linguistic phrases," The Journal of Neuroscience, 31 (8): 2801-2814, 2011.
14. E. Bialystok and M. Viswanathan, "Components of executive control with advantages for bilingual children in two cultures," Cognition, 112 (3): 494, 2009.
15. J. R. Binder, R. H. Desai, W. W. Graves, and L. L. Conant, "Where is the semantic system? A critical review and meta-analysis of 120 functional neuroimaging studies," Cerebral Cortex, 19 (12): 2767-2796, 2009.
16. M. F. Bonner and M. Grossman, "Gray matter density of auditory association cortex relates to knowledge of sound concepts in primary progressive aphasia," The Journal of Neuroscience, 32 (23): 7986-7991, 2012.
17. M. F. Bonner, J. E. Peelle, P. A. Cook, and M. Grossman, "Heteromodal conceptual processing in the angular gyrus," NeuroImage, 71: 175-186, 2013.
18. M. F. Bonner and A. R. Price, "Where is the anterior temporal lobe and what does it do?" The Journal of Neuroscience, 33 (10): 4213-4215, 2013.
19. J. Brennan and L. Pylkkänen, "Processing events: Behavioral and neuromagnetic correlates of aspectual coercion," Brain and Language, 106 (2): 132-143, 2008.
20. J. Brennan and L. Pylkkänen, "The time-course and spatial distribution of brain activity associated with sentence processing," NeuroImage, 2012.
21. C. Burgess, "From simple associations to the building blocks of language: Modeling meaning in memory with the hal model," Behavior Research Methods, 30 (2): 188-198, 1998.
22. A. Caramazza and J. R. Shelton, "Domain-specific knowledge systems in the brain: The animate-inanimate distinction," Journal of cognitive neuroscience, 10 (1): 1-34, 1998.
23. G. N. Carlson, "Thematic roles and their role in semantic interpretation. Linguistics, 22 (3): 259-280, 1984.
24. G. N. Carlson and M. K. Tanenhaus, "Thematic roles and language comprehension," Syntax and semantics, 21: 263-288, 1988.
25. C. Carpineto and G. Romano. Concept Data Analysis: Theory and Applications. Wiley, Chapter 2, 2004.
26. V. A. Carr, J. Rissman, and A. D. Wagner, "Imaging the human medial temporal lobe with high-resolution FMRI," Neuron, 65 (3): 298-308, 2010.
27. B. A. Colaianne and M. G. Powell, "Developing transferrable geospatial skills in a liberal arts context," Journal of Geoscience Education, 59 (2): 93-97, 2011.
28. B. A. Davey and H. A. Priestley. Introduction to lattices and order. Cambridge University Press, Chapters 2 and 3, 2002.
29. F. Doshi, K. T. Miller, J. Van Gael, and Y. W. The, "Variational inference for the indian buffet process," In Proceedings of the International Conference on Artificial Intelligence and Statistics, 2008.
30. D. Endres, P. Foldiak, and U. Priss, "An application of formal concept analysis to semantic neural decoding," Annals of Mathematics and Artificial Intelligence, 57 (3): 233-248, 2009.
31. D. Endres, R. Adam, M. Giese, and U. Noppeney, "Understanding the semantic structure of human fMRI brain recordings with formal concept analysis," In Proceedings of the 10th international conference on Formal Concept Analysis, pages 96-111, 2012.
32. T. Fawcett, "An introduction to ROC analysis," Pattern recognition letters, 27 (8): 861-874, 2006.
33. D. A. Feinberg, et al., "Multiplexed echo planar imaging for sub-second whole brain FMRI and fast diffusion imaging," PLoS One, 5 (12): e15710, 2010.
34. C. Fellbaum, Wordnet: An electronic lexical database. A Bradford Book, Chapter 4, 1998.

35. K. J. Friston, et al., "Spatial registration and normalization of images," Human brain mapping, 3 (3): 16.5-189, 1995.
36. Bernhard Ganter, Rudolf Wille, and Rudolf Wille. Formal concept analysis. Springer Berlin, Chapter 1, 1999.
37. G. Garbin, S. Collina, and P. Tabossi, "Argument structure and morphological factors in noun and verb processing: An fMRI study," PLOS ONE, 7 (9): e45091, 2012.
38. R. Goldstone, "An efficient method for obtaining similarity data," Behavior Research Methods, 26 (4): 381-386, 1994.
39. T. L. Griffiths and Z. Ghahramani, "The indian buffet process: an introduction and review," Journal of Machine Learning Research, 12: 1185-1224, 2011.
40. M. Grossman, et al., "Neural representation of verb meaning: an fMRI study," Human brain mapping, 15 (2): 124-134, 2001.
41. M. Grossman, et al., "The neural basis for category-specific knowledge: an fMRI study," NeuroImage, 15 (4): 936-948, 2002.
42. M. Grossman, et al., "Category-specific semantic memory: Converging evidence from BOLD fMRI and Alzheimer's disease," NeuroImage, 2012.
43. T. M. Gureckis and B. C. Love, "Direct associations or internal transformations? Exploring the mechanisms underlying sequential learning behavior," Cognitive Science, 34 (1): 10-50, 2010.
44. A. H. Gutchess, et al., "Neural differences in the processing of semantic relationships across cultures," Social cognitive and affective neuroscience, 5 (2-3): 254-263, 2010.
45. E. Halgren, et al., "N400-like magnetoencephalography responses modulated by semantic context, word frequency, and lexical class in sentences," NeuroImage, 17 (3): 1101-1116, 2002.
46. D. R. Heise. Expressive order: Confirming sentiments in social actions. Springer, Chapter 2, 2006.
47. A. H. Huth, et al., "A continuous semantic space describes the representation of thousands of object and action categories across the human brain," Neuron, 76: 1210-1224, 2012.
48. P. Indefrey, "A meta-analysis of hemodynamic studies on first and second language processing: Which suggested differences can we trust and what do they mean?" Language Learning, 56 (s1): 279-304, 2006.
49. D. Kemmerer, et al., "Neuroanatomical distribution of five semantic components of verbs: Evidence from fMRI," Brain and language, 107 (1): 16-43, 2008.
50. P. Koenig and M. Grossman, Neural basis of semantic memory, Chapter: Process and content in semantic memory, pages 247-264. Cambridge University Press, 2007.
51. Z. Kourtzi and N. Kanwisher, "Activation in human mt/mst by static images with implied motion," Journal of cognitive neuroscience, 12 (1): 48-55, 2000.
52. B. A. Kuhl, et al., "Multi-voxel patterns of visual category representation during episodic encoding are predictive of subsequent memory," Neuropsychologia, 50 (4): 458-469, 2012.
53. G. R. Kuperberg, et al., "The role of animacy and thematic relationships in processing active english sentences: Evidence from event-related potentials," Brain and Language, 100 (3): 223-237, 2007.
54. M. Kutas and S. A. Hillyard, "Brain potentials during reading reflect word expectancy and semantic association," Nature, 307 (5947): 161-163, 1984.
55. T. Landauer and S. Dumais, "A solution to Plato's problem: the latent semantic analysis theory of acquisition, induction, and representation of knowledge," Psychological Review, 104: 211-240, 1997.
56. B. J. Levy and A. D. Wagner, "Measuring memory reactivation with functional MRI implications for psychological theory," Perspectives on Psychological Science, 8 (1): 72-78, 2013.
57. I. Levy, et al., "Center-periphery organization of human object areas," Nature neuroscience, 4 (5): 533-539, 2001.
58. R. Levy, "Expectation-based syntactic comprehension," Cognition, 106 (3): 1126-1177, 2008.
59. J. C. Liang, et al., "Content representation in the human medial temporal lobe," Cerebral Cortex, 2012.
60. T. Linzen., A. Marantz, and L. Pylkkänen, "Syntactic context effects in visual word recognition: An MEG study," The Mental Lexicon 8.2, 117-139, 2013.
61. Hugo Lövheim, "A new three-dimensional model for emotions and monoamine neurotransmitters," Medical Hypotheses 78.2, 341-348, 2012.
62. B. Z. Mahon and A. Caramazza, "Concepts and categories: a cognitive neuropsychological perspective," Annual review of psychology, 60: 27, 2009.
63. Doug Markant and Todd M Gureckis, "Does the utility of information influence sampling behavior?" In Proceedings of the 34th Annual Conference of the Cognitive Science Society, Austin, Tex.: Cognitive Science Society, 2012.
64. A. Martin, "The representation of object concepts in the brain," Annual review of psychology, 58: 25-45, 2007.
65. J. V. McDonnell, et al., "Sparse category labels obstruct generalization of category membership," Proceedings of the 34th Annual Conference of the Cognitive Science Society, Austin, Tex., Cognitive Science Society, 2012
66. G. McLachlan and D. Peel, Finite mixture models, volume 299. Wiley Interscience, Chapter 2, 2000.
67. G. A. Miller and C. Fellbaum, "Semantic networks of English," Cognition, 41 (1): 197-229, 1991.
68. G. A Miller and P. N. Johnson-Laird. Language and perception. Belknap Press, 1976.
69. T. M. Mitchell, et al., "Predicting human brain activity associated with the meanings of nouns," Science, 320 (5880): 1191-1195, 2008.
70. M. M. Monti, "Statistical analysis of fMRI time-series: A critical review of the GLM approach," Frontiers in Human Neuroscience, 5 (28), 2011.
71. C. E. Osgood, G. J. Suci, and P. Tannenbaum. The measurement of meaning. University of Illinois Press, Chapter 1, 1967.
72. K. Pammer, et al., "Visual word recognition: the first half second," NeuroImage, 22 (4): 1819-1825, 2004.
73. A. Parbery-Clark, S. Anderson, E. Hittner, and N. Kraus, "Musical experience strengthens the neural representation of sounds important for communication in middle-aged adults," Frontiers in aging neuroscience, 4, 2012.
74. K. Patterson, P. J. Nestor, and T. T. Rogers, "Where do you know what you know? The representation of semantic knowledge in the human brain, "Nature Reviews Neuroscience, 8 (12): 976-987, 2007.
75. F. Pereira, et al., "Generating text from functional brain images," Frontiers in Human Neuroscience, 5 (72), 2011.
76. R. A. Poldrack, et al. Handbook of functional MRI data analysis. Cambridge University Press, Appendix A, 2011.
77. F. Pulvermüller and O. Hauk, "Category-specific conceptual processing of color and form in left fronto-temporal cortex," Cerebral Cortex, 16 (8): 1193-1201, 2006.

78. L. Pylkkänen and B. McElree, "An MEG study of silent meaning," Journal of Cognitive Neuroscience, 19 (11): 1905-1921, 2007.
79. L. Pylkkänen, A. E. Martin, B. McElree, and A. Smart, "The anterior midline field: Coercion or decision making?" Brain and Language, 108 (3): 184-190, 2009.
80. Liina Pylkkänen. Introducing arguments, volume 49. MIT Press, Chapter 1, 2008.
81. L. Pylkkänen, et al., "The representation of polysemy: MEG evidence," Journal of Cognitive Neuroscience, 18 (1): 97-109, 2006.
82. J. Rissman, et al., "Detecting individual memories through the neural decoding of memory states and past experience," Proceedings of the National Academy of Sciences, 107 (21): 9849-9854, 2010.
83. D. C. Rubin, "51 properties of 125 words: A unit analysis of verbal behavior," Journal of Verbal Learning and Verbal Behavior, 19 (6): 736-755, 1980.
84. J. A. Russell, "A circumplex model of affect," Journal of personality and social psychology, 39 (6): 1161, 1980.
85. A. V. Samsonovich, "A metric scale for 'abstractness' of the word meaning," In Workshops at the Twenty-Sixth AAAI Conference on Artificial Intelligence, 2012.
86. A. V. Samsonovich and G. A. Ascoli, "A simple neural network model of the hippocampus suggesting its path-finding role in episodic memory retrieval," Learn Mem, 12 (2): 193-208, 2005.
87. V. Samsonovich and G. A. Ascoli. Advances in Artificial General Intelligence: Concepts, Architectures and Algorithms, chapter Cognitive Map Dimensions of the Human Value System Extracted from Natural Language, pages 111-124. IOS Press, 2007.
88. A. V. Samsonovich and G. A. Ascoli, "Computing semantics of preference with a semantic cognitive map of natural language: application to mood sensing from text," Multidisciplinary Workshop on Advances in Preference Handling from the 2008 AAAI Workshop, AAAI Technical Report WS-08, Vol. 9, 2008.
89. A. V. Samsonovich and G. A. Ascoli, "Principal semantic components of language and the measurement of meaning," PloS one, 5 (6): e10921.1-e10921.17, 2010.
90. A. V. Samsonovich and C. P. Sherrill, "Comparative study of self-organizing semantic cognitive maps derived from natural language," In Proceedings of the 29th Annual Cognitive Science Society, 2007.
91. A. V. Samsonovich and G. A. Ascoli, "Augmenting weak semantic cognitive maps with an 'abstractness' dimension," Computational Intelligence and Neuroscience, 2013.
92. P. Schwenkreis, et al., "Assessment of sensorimotor cortical representation asymmetries and motor skills in violin players," European Journal of Neuroscience, 26 (11): 3291-3302, 2007.
93. R. Sebastian, A. R. Laird, and S. Kiran, "Meta-analysis of the neural representation of first language and second language," Applied Psycholinguistics, 32 (4): 799, 2011.
94. M. L. Seghier, F. Kherif, G. Josse, and C. J. Prince, "Regional and hemispheric determinants of language laterality: implications for preoperative fMRI," Human Brain Mapping, 32: 1602-1614, 2011.
95. K. A. Shapiro, F. M. Mottaghy, N. O. Schiller, T. D. Poeppel, M. O. Flüß, H-W Miller, A. Caramazza, and B. J. Krause, "Dissociating neural correlates for nouns and verbs," Neuroimage, 24 (4): 1058-1067, 2005.
96. S. V. Shinkareva, et al., "Using FMRI brain activation to identify cognitive states associated with perception of tools and dwellings," PLoS One, 3 (1): e1394, 2008.
97. S. V. Shinkareva, et al., "Commonality of neural representations of words and pictures," Neuroimage, 54: 2418-2425, 2011.
98. S. V. Shinkareva, et al., "Exploring commonalities across participants in the neural representation of objects," Human Brain Maping, 33: 1375-1383, 2012.
99. W. K. Simmons, V. Ramjee, M. S. Beauchamp, K. McRae, A. Martin, and L. W. Barsalou, "A common neural substrate for perceiving and knowing about color," Neuropsychologia, 45 (12): 2802-2810, 2007.
100. O. Sporns, "Network attributes for segregation and integration in the human brain," Current Opinion in Neurobiology, 2013.
101. E. Vul, D. Lashkari, P. J. Hsieh, P. Golland, and N. Kanwisher, "Data-driven functional clustering reveals dominance of face, place, and body selectivity in the ventral visual pathway," Journal of Neurophysiology, 108 (8): 2306-2322, 2012.
102. E. Vul, et al., "Puzzlingly high correlations in FMRI studies of emotion, personality, and social cognition," Perspectives on Psychological Science, 4 (3): 274-290, 2009.
103. E. Vul, et al., "Data-driven functional clustering reveals dominance of face, place, and body selectivity in the ventral visual pathway," Journal of neurophysiology, 2012.
104. M. Westerlund and L. Pylkkänen, "Characterizing the role of the left anterior temporal lobe in combinatory processes," The Society for the Neurobiology of Language Abstracts, 2011.
105. E. Yacoub, et al., "Imaging brain function in humans at 7 tesla," Magnetic Resonance in Medicine, 45 (4): 588-594, 2001.
106. E. Yacoub, et al., "Spin-echo FMRI in humans using high spatial resolutions and high magnetic fields," Magnetic resonance in medicine, 49 (4): 655-664, 2003.
107. E. Yacoub, et al., "High-field FMRI unveils orientation columns in humans," Proceedings of the National Academy of Sciences, 105 (30): 10607-10612, 2008.
108. Wille. Ordered Sets, chapter: Restructuring Lattice Theory: an approach based on hierarchies of concepts, pages 445-470. Reidel, Dordrecht-Boston, 1982.
109. M. B. Chang, et al., "A latent feature analysis of the neural representation of conceptual knowledge," In Proceedings of the 2012 Conference of the North American Chapter of the Association for Computational Linguistics: Human Language Technologies, Montreal, Canada, 377-381, 2012.
110. T. M. Gureckis and B. C. Love, "Bridging levels: Using a cognitive model to connect brain and behavior in category learning," In Proceedings of the 28th Annual Meeting of the Cognitive Science Society, pages 315-320, 2006.
111. B. C. Love and T. M. Gureckis, "Models in search of a brain," Cognitive, Affective, & Behavioral Neuroscience, 7(2):90-108, 2007.
112. B. C. Love, et al., "Sustain: a network model of category learning," Psychological review, 111(2):309, 2004.
113. W. D. Penny, et al., editors. Statistical Parametric Mapping: The Analysis of Functional Brain Images. Academic Press, Chapter 8, 2007.
114. M. Havlicek, et al., "Dynamic modeling of neuronal responses in fmri using cubature kalman filtering," NeuroImage, 56(4):2109, 2011.

115. T. M. Mitchell, et al., "Predicting human brain activity associated with the meanings of nouns," Science, 320 (5880):1191-1195, 2008.
116. J. M. Zumer, et al., "Relating bold FMRI and neural oscillations through convolution and optimal linear weighting," Neuroimage, 49(2): 1479-1489, 2010.
117. F. I. Karahanoglu, et al., "Total activation: FMRI deconvolution through spatio-temporal regularization," NeuroImage, 2013.
118. C. C. Gaudes, F. I. Karahanoglu, F. Lazeyras, and D. Van De Ville, "Structured sparse deconvolution for paradigm free mapping of functional MRI data," In Biomedical Imaging (ISBI), 2012 9th IEEE International Symposium on, pages 322-325. IEEE, 2012.
119. K. Lee, et al., "A data-driven sparse GLM for fMRI analysis using sparse dictionary learning with mdl criterion," Medical Imaging, IEEE Transactions on, 30(5): 1076-1089, 2011.
120. Härdle, Wolfgang; Simar, Léopold, "Canonical Correlation Analysis," Applied Multivariate Statistical Analysis, pp. 321-330, 2007.

(2) PRINCIPAL ASPECTS

The present invention has three "principal" aspects. The first is a system for predicting and interpreting conceptual knowledge in the brain. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein. The one or more processors may have an associated memory with executable instructions encoded thereon such that when executed, the one or more processors perform multiple operations. The associated memory is, for example, a non-transitory computer readable medium.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, or a field programmable gate array.

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
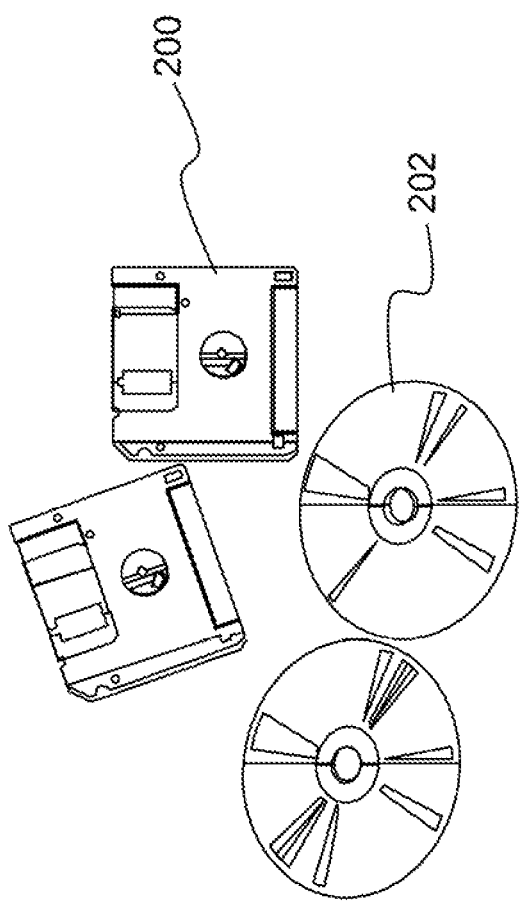
FIG. 2 is an illustration of a computer program product according to various embodiments of the present invention.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) INTRODUCTION

A purpose of the system according to the principles of the present invention is to predict and interpret conceptual knowledge in the brain. "Prediction" refers to a forward model of concepts to neural representations; that is, given a concept like "doctor," the model will produce the spatiotemporal activation map of the brain. "Interpretation" refers to an inverse model of neural representations to concepts; that is, given a representation of spatiotemporal activation map of the brain, what concept is the subject thinking of? "Conceptual knowledge" refers to knowledge of entities, their abilities, their properties, and relationships among other concepts. Non-limiting examples of concepts include objects (e.g., "doctor", "car"), abilities (e.g., "drove", "treated"), properties (e.g., "yellow", "in the morning"), and their combination (e.g., "The doctor drove the car."). In addition to prediction and interpretation, the present invention has two types of competencies, or capabilities, demonstrated in "phases." Phase 1 elucidates how the brain's representations of a single "target" concept vary as a function of the context—or test concepts—in which it is embedded. For example, a phase 1 target concept might be "doctor" while the test concept might be the sentence "The doctor drove the car." Using this example, interpretation would consist of recognizing that a subject was presented with the word "doctor" after he/she were presented with the sentence "The doctor drove the car."

Phase 1 is further divided into Phase 1a and Phase 1b. In Phase 1a, the system according to the principles of the present invention is fed "development concepts" which are used to initially optimize system parameters. In Phase 1b, the system is validated on previously unseen test and target concepts.

Phase 2 elucidates how the brain represents combinations of multiple "target" concepts in a specific "test" context. For example, a phase 2 target concept might be "The boy gave the carpenter a hammer" while the test concept might be "The boy gave the carpenter a hammer" (again), "The carpenter held a screwdriver," "The man climbed the ladder," etc. Using this example, interpretation would consist of recognizing that a subject was presented with the sentence "The boy gave the carpenter a hammer" among the previous set of test concepts. Each of the aspects introduced above will be described in further detail below.

The following is a description of previous approaches and the improvements of the invention described herein. Current neuroscience studies of concepts are typically qualitative and are limited to small domains (e.g., living vs. non-living, as described in Literature Reference No. 22). In the present invention, matrix decomposition methods in the neuroceptual lattice (see Literature Reference No. 31) will quantify concepts along one or more of several dimensions including categorical (see Literature Reference Nos. 22 and 62 for a description of a categorical dimension), distributed (see Literature Reference No. 64 for a description of a distributed dimension), sensory-motor (see Literature Reference No. 41 for a description of a sensory-motor dimension), and heteromodal (see Literature Reference No. 50 for a description of a heteromodal dimension).

Furthermore, in modeling, direct decoding (as described in Literature Reference Nos. 47 and 75) often ignores anatomical constraints (described in Literature Reference Nos. 2 and 70), is not interpretable, and may not generalize to novel concepts. The system according to various embodiments of the present invention utilizes lattice theory, which is data driven, makes predictions for novel concepts using hierarchical relationships, and offers a "neural grammar" to explain the links between concepts and their neural representations (see Literature Reference No. 30 for a description of the links between concepts and their neural representations). Additionally, ontologies (described in Literature Reference Nos. 34 and 55) typically remove important dimensions of variation, such as valence. In the present invention, principal semantics retain several dimensions of variations, such as valence, arousal, and freedom (see Literature Reference Nos. 85, 87, 88, 90, and 91).

In experimental studies, typical inputs are divorced from context (e.g., static images or text, such as described in Literature Reference Nos. 22 and 75) and are of restricted variety, limiting their ecological validity. Using the system according to various embodiments of the present invention, concepts are presented with semantic context systematically varied along dimensions, such as property emphasis and grammatical role, to study how context modulates neural representations. This complements previous studies described in Literature Reference Nos. 19 and 81. In prior experiments, across subject differences are often ignored, restricting generalization to other subjects (see Literature Reference Nos. 22 and 75). In the present invention, cohort definitions guide the selection of subjects along sensory-motor and executive dimensions. Questionnaires and semantic judgements quantify individual differences across subjects, which then provide additional regressors to explain differences in neural data. Subject-specific models have been built in other domains, as described in Literature Reference Nos. 43, 63, and 65. Finally, in previous studies, tasks are usually passive, which reduces subject motivation and, consequently, signal-to-noise ratio. As an improvement, adaptive sampling maximizes efficiency in scan time according to various embodiments of the present invention.

(4) SPECIFIC DETAILS OF THE INVENTION

Theories of neural representation of concepts have previously been qualitative rather than quantitative for several reasons. First, most theories have been driven by experimental approaches and most approaches have consisted of creating brain maps of features. Second, such maps work in domains where the features are orthogonally decomposed and result in classical receptive field descriptions, which is not the case for semantics where the meaning of even single concepts often relies on associating multiple heterogeneous representations. Third, experimentally driven theories often focus on representations that the experimental modality is best at measuring, so joint spatiotemporal theories for composite concepts are under-investigated.

Figure 3:
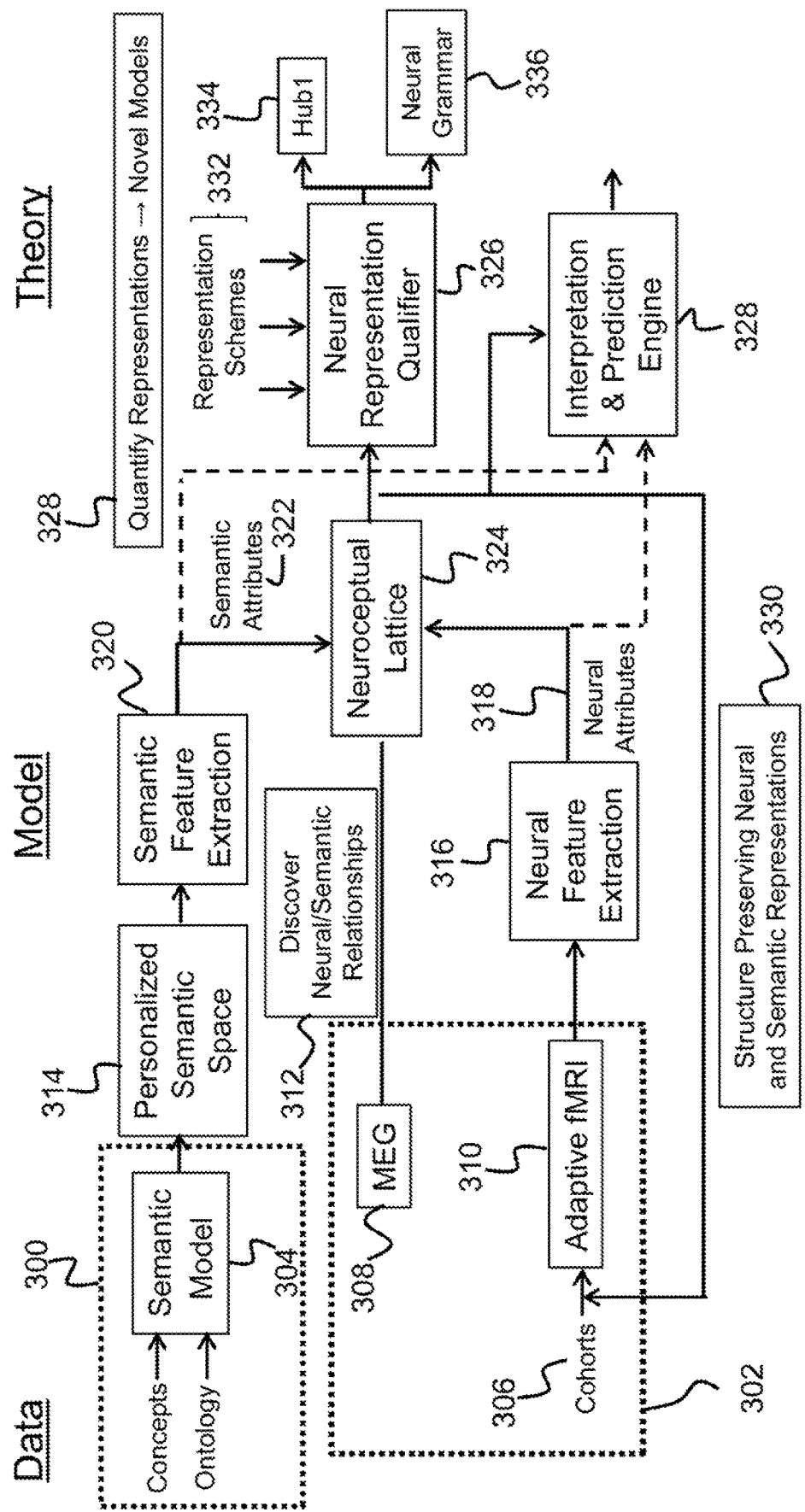
FIG. 3 is a flow diagram illustrating a system for predicting and interpreting conceptual knowledge in the brain according to various embodiments of the present invention.

In the system of the present invention, a novel meta-model referred to as, KRNS-MEANING, was developed for neural representations using experiments that maximize sensitivity in both space and time. FIG. 3 illustrates a flow diagram of the system according to various embodiments of the present invention. The approach, depicted in FIG. 3, overcomes the limitations above to go beyond localizing function. KRNS-MEANING provides a computational framework that quantifies neural representations. Principally, the system described herein learns the structure of both neural signals (neural lattice) and the semantics of concepts (semantic lattice), and maps them into a neuroceptual lattice.

To capture structure in semantic and behavioral spaces, a semantic analysis tool 300 and a behavioral exam 302 (e.g., survey of abilities of cohorts) were developed. The semantic analysis tool 300 comprises a semantic model 304 that represents a multitude of features and relations that transcend simple corpus statistics. The behavioral exam 302 is used to assess calibration subjects into cohorts 306 defined by musical, linguistic, and STEM (science, technology, engineering, mathematics) ability, which are known to differ along various neural dimensions. The calibration subjects are assessed via MEG 308 and adaptive fMRI 310. In addition, the behavioral exam 302 discovers neural/semantic relationships 312 to modify a personalized semantic space 314 developed by the semantics model 304. The personalized semantic space 314 is used to sequence stimuli to maximize concept elicitation during fMRI 310 experiments.

Figure 18:
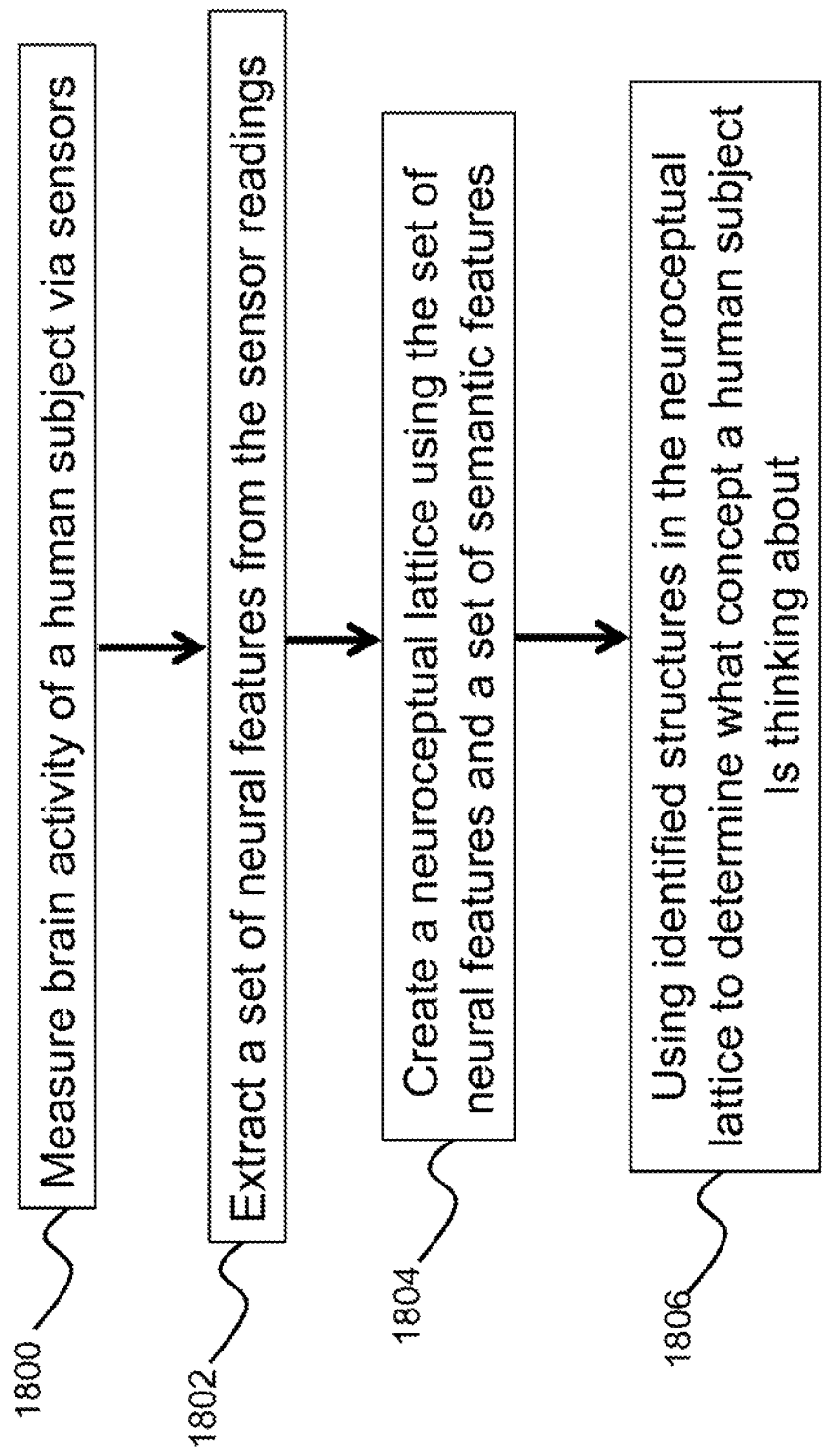
FIG. 18 is a flow diagram illustrating how sensor readings are used for interpretation and prediction according to various embodiments of the present invention.

Neural feature extraction 316 provides a full set of features (or neural attributes 318) from fMRI 310 data using functional clustering and the latent feature extraction (see Literature Reference No. 101). Semantic feature extraction 320 provides semantic attributes 322 (or semantic features) from the personalized semantic space 314. A neuroceptual lattice 324 is created by aligning semantic attributes 322 and neural attributes 318. Maximizing prediction and interpretation is done by using adaptive fMRI 310 experiments that analyze the neuroceptual lattice 324 to improve alignment between the semantic and neural lattices. A neural representation quantifier 326 identifies structures in the neuroceptual lattice 324 and quantifies them into neural models 328. The neural representation quantifier 326 extracts the representation schemes 332 from the structure of the neuroceptual lattice 324. Finally, the attributes of the neuroceptual lattice 324 guide the model to rank similarities of target concepts during interpretation and prediction via an interpretation and prediction engine 328. Given a measurement of the brain based on a sensor reading, such as an fMRI image, the interpretation and prediction engine 328 produces an ordered list of the likely concepts that that the brain of a test subject is thinking (i.e., interpretation). Given some concept, a likely activity pattern of the brain of the test subject, such as measured by fMRI, is used as a prediction. Importantly, a calibration subject and a test subject can be the same person or different human subjects. FIG. 18 depicts a flow diagram of how sensor readings result in interpretation and prediction in a test subject. In a first step 1800, brain activity of a human subject (e.g., calibration subject, test subject) is measured via at least one sensor. Non-limiting examples of sensors include fMRI, MEG, electroencephalogram (EEG), diffusion tensor imaging (DTI), and functional near-infrared spectroscopy (fNIRS). In a second step 1802, a set of neural features are extracted from the sensor readings. In a third step 1804, a neuroceptual lattice is created from the set of neural features and a set of semantic features. In a fourth step 1806, structures identified in the neuroceptual lattice are used to determine what concept a human subject is thinking about.

Results from experimental studies indicate that structure in the neuroceptual lattice 324 serves well for interpretation and prediction; however, it also serves to investigate theories (described in section 4.1). Because the neuroceptual lattice 324 is grounded in the mathematics of formal concept analysis (FCA), methods exist to analyze its structure using collected neural data with respect to hypothetical structure from neural and semantic representation schemes 330.

To start, the multiple representation schemes 332 are quantified for concepts that are associated through network hubs (e.g., Hub1 334), likely the heteromodal association areas (HAAs) in the brain and neural grammar 336, and described in further detail below. A network hub is a common connection point or area in the brain where many other regions connect. A neural grammar 336 is a set of grammar-like rules that describe the structures and relationship of neural features of the brain that are present when particular semantic concepts are being thought. These are abstracted out of the neuroceptual lattice 324. However, the interpretation and prediction engine 328 is agnostic to any given theory and is used to discover new quantitative representation schemes. In support of the approach described above, both the models (e.g., neuroceptual lattice 324) that discover features and structure, and the experiments that elicit them, provide finer distinctions and higher resolution from Phase 1 to 2. These phases increase the difficulty of interpretation and prediction from simple to complex.

KRNS-MEANING brings together new methods to discover latent features in blood-oxygen-level dependent (BOLD) contrast imaging and magnetoencephalography (MEG) to map the structure (i.e., neural lattice) that underlies concepts in the brain. In parallel, a semantic lattice is iteratively built using a new technique that captures quantitative semantic relations from semantic attributes. The semantic lattice is refined using behavioral data from the behavioral exams and cognitive models to reflect differences in conceptual structure between cohorts, and later individuals.

Early experiments in each phase are used to learn the primary spatial representations of conceptual activity using 3T imaging, and to uncover the time course of neural representations using MEG imaging. T denotes Tesla, which is a unit for the strength of a magnetic field. Stronger magnetic fields in MRI machines typically correspond to higher resolution of imagery. At the end of each phase, high-resolution functional magnetic resonance imaging (fMRI) (7T) is conducted to further demonstrate understanding of conceptual representation. The experimental design incorporates a diverse expertise in the neuroscience of concepts, neurolinguistics, cognitive phenotypes for cohort analysis, neural image registration and segmentation, MRI technology development, and application in functional and structural imaging (described in section 4.3).

In the present invention, innovations in neuroimaging, machine learning, linguistics, experimental analysis and design are used to develop and assess a novel meta-theory that explains how the human brain represents conceptual knowledge, thereby achieving an accuracy and predictive/interpretive power never accomplished before. The table in FIG. 9 depicts innovations and benefits in KRNS-MEANING.

(4.1) Theory

In KRNS-MEANING, a novel meta-model of knowledge representations is defined using a neuroceptual lattice 324 that identifies the relevant spatial and temporal features of single or multiple concepts, as well as how these features are modulated by the major contextual dimensions. An advantage of the approach according to the principles of the present invention is that it is independent of any particular theoretical representation scheme 332. Even if a priori representation schemes 332 are incorrect or incomplete, the present invention derives the underlying representation scheme 332 from neural data and produces a unique and robust theory of conceptual knowledge.

(4.1.1) Heteromodal Association Areas

Figure 10:
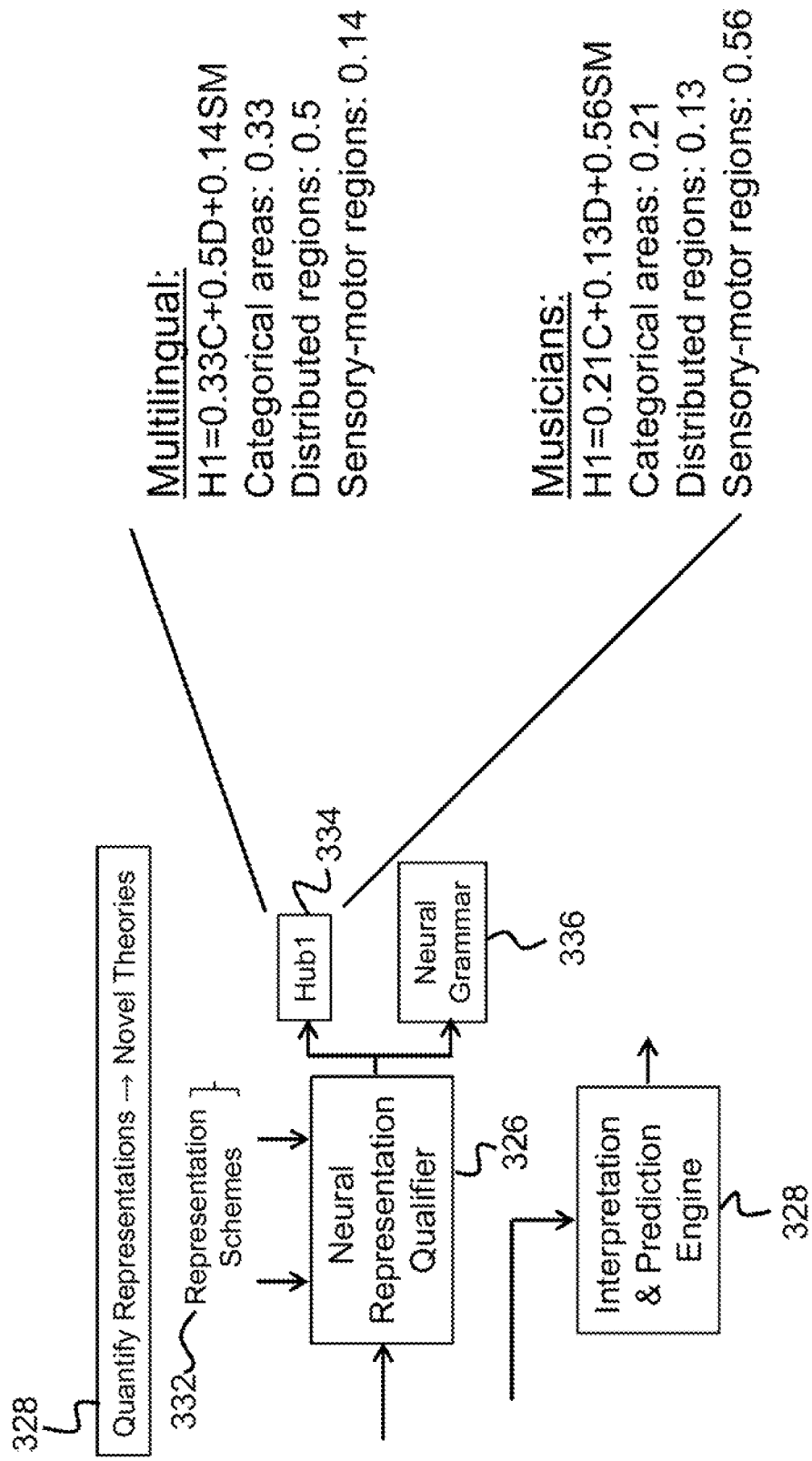
FIG. 10 is an illustration of leveraging the salient differences in various cohorts according to various embodiments of the present invention.

Heteromodal association areas (HAA), a seminal theory, act as network hubs (e.g., Hub1 334) in the brain by integrating sensory-motor, categorical, and distributed representation schemes 332 (see Literature Reference No. 17). HAAs are thought to combine, organize, process, and contextually modulate modal-specific concept representations. The system according to various embodiments of the present invention discovers novel HAA networks by using high resolution spatial/temporal imaging. fMRI 310 maps the fine spatial structure of concept representations in brain regions networked through HAAs. FIG. 10 illustrates that by leveraging salient differences in multilinguals and musicians, KRNS-MEANING better quantifies the neural representations of concept knowledge within and across sessions. FIG. 10 depicts an example of a representation scheme, indicating that musicians have more activity in sensory-motor regions, while multilinguals have higher activity in distributed regions. The table in FIG. 11 includes justification and predictions of human behavioral cohorts, which improves generalization across subjects.

Figure 12:
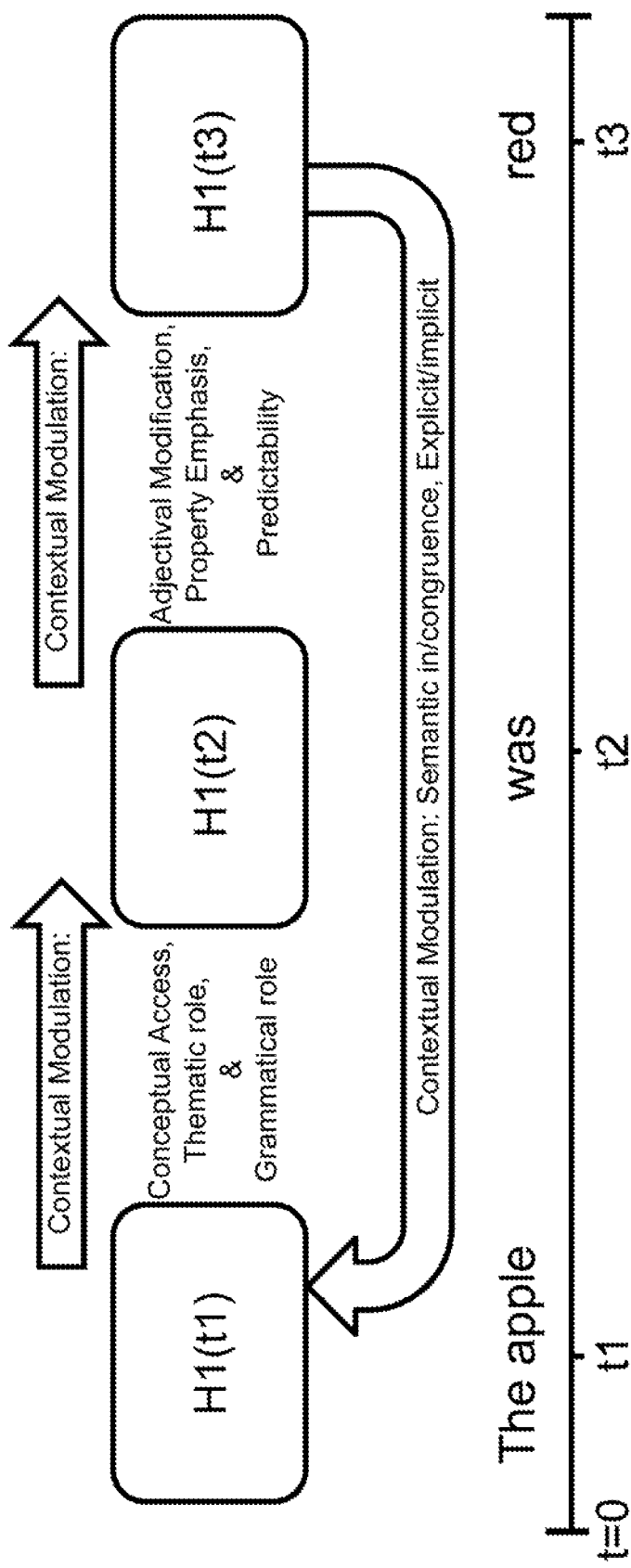
FIG. 12 is an illustration of magnetoencephalography (MEG) measuring the contextual modulation of heteromodal association areas (HAA) networks of concept representations according to various embodiments of the present invention.

State-of-the-art fMRI studies cannot measure the detailed temporal sequence of concept representations. MEG imaging, however, measures the contextual modulation of HAA networks of concept representations. MEG imaging identifies the temporal activation sequences of these regions, elucidating how these networks are modulated by context. FIG. 12 shows the processing of the temporal evolution of a sentence with respect to the hub equations 1, 2, and 3 below. In this simple example, as time unfolds, the property of the noun (apple) is being modulated by the verb (was) and eventually by the adjective (red) resolving context. MEG and fMRI data are integrated using canonical correlation analysis (CCA) (see Literature Reference No. 120) to quantify spatiotemporal sequences of regional representation schemes (see SCCAN (Sparse Canonical Correlation Analysis for Neuroimaging), a variant of CCA, described in section 4.3).

By selecting cohorts to evoke maximal difference in concept representation schemes, the commonalities, variability, and stability of neural features within and across human subjects are described. The derived representation is verified implicitly by testing its predictions across subjects, and explicitly by measuring interpretation and prediction performance using receiver operating characteristic (ROC) and bootstrap analysis (described in section 4.2.4 and Literature Reference No. 32). Additionally, fMRI verifies the temporal sequence during training using modified stimuli (e.g., imaging "The doctor" alone will verify the first brain region activated in the sentence "The doctor drove the car").

Many theories have been proposed for how the brain represents conceptual knowledge, but no single theory is fully explanatory. These representation schemes offer useful spatiotemporal constraints (e.g., the word "splash" activates auditory association cortex (see Literature Reference No. 16), but only provide a starting point toward the current and pressing need to understand these representations in a generalizable framework independent of specific theoretical assumptions. Furthermore, current regression methods discard neuroanatomical and spatial voxel relationships, which are critical components of conceptual representations that must be preserved.

(4.1.2) Quantitative Model Discovery

Novel spatiotemporal neural models are developed and quantified using lattice factorization methods to measure the degree to which they explain a given neural activity pattern (e.g., see equations 1 and 2 below, and section 4.2.4). This approach directly influences prediction and interpretation in Phases 1b & 2 as the system learns the maximally informative semantic attributes of individuals and cohorts (described in section 4.2.2).

It is believed that a combination of sensory-motor, categorical, and distributed representation schemes of concepts are organized, processed, and contextually modulated by heteromodal association cortices (e.g., HAAs). Sensory-motor, categorical, and distributed dimensions are identified across brain regions, focusing on the angular gyrus, mid-lateral temporal cortex, anterior temporal lobe (ATL), and the dorsolateral prefrontal cortex (dlPFC) to form a comprehensive theoretical understanding of the binding of these spatial representation schemes (see Literature Reference Nos. 15, 17, 18, and 42). Heteromodal areas are defined using anatomical T1 magnetic resonance imaging (MRI) scans in conjunction with neuroanatomical atlases and coordinates of previously published loci, registered across subjects using a nested hub model (see Literature Reference No. 100). For example, $$\text{Hub1} = A_1 SM + B_1 \text{Dist.} + C_1 \text{Cat} \qquad \text{(Equation 1)}$$

$$\text{Hub2} = A_2 SM + B_2 \text{Dist.} + C_2 \text{Cat} \qquad \text{(Equation 2)}$$

$$\text{Hub3} = A_3 \text{Hub1} + B_3 \text{Hub2} \qquad \text{(Equation 3)}$$

T1 relaxation is measured using a time constant called T1 (usually reported in milliseconds, msec). T1 is defined as the time when 63% of the longitudinal magnetization has recovered such that 3×T1=95% recovery. In the equations above, SM represents sensory motor activity, which is the degree of activation in the brain in the sensory motor cortex above baseline versus task evoked. Dist represents distributed region, which is the degree of uniform activation across the whole brain. Cat represents categorical area, which is the degree of focality of activation relative to its semantic parent. Equations 1-3 are meant to describe the degree of representation type (sensory motor, distributed, categorical) that is present in the various heteromodal association hubs in the brain. This analysis links segregated modal-specific concept representation schemes to quantify the common, variable, and stable brain regions, networks, and spatial features across individuals.

In order to assess the commonality and variability of the derived representations, individual differences through cohorts who possess predetermined biases for concept representation are assessed by experience. Individuals are selected who have strong experience as musicians, quantitative majors, and multilingual speakers. Since these categories are not mutually exclusive, all participants were surveyed on these and other behavioral and semantic features (described in section 4.3).

(4.1.3) Temporal Theories of Contextual Modulation and Composition

HAAs are likely the anatomical loci for concept-wide contextual modulation due to their central role in organizing and pooling the different neural features across representational schemes of single concepts. Furthermore, the timescales of inter-regional processing are also thought to be organized hierarchically (see Literature Reference No. 42). It is, therefore, posited that temporal sequences of HAA network representations are modulated by the contextual dimensions within the test concepts (see FIG. 12 and the table in FIG. 13). This analysis relates the contextual dimensions to regional activities within the representational schemes of the HAA networks. For example, conceptual access has been shown to affect the distribution of subcategorical representations in the left anterior temporal lobe (ATL) (see Literature Reference No. 60).

Representation of multiple concepts requires HAAs to provide conceptual access to semantic meaning in the course of rapid processing and composition. It does not require accessing a fully elaborated semantic representation of each individual concept—only the most salient neural features (see section 4.3 and Literature Reference No. 20). Thus, HAA network quantification explains how the brain represents combinations of individual concepts by identifying the essential neural features of the combined concept necessary to gain a coherent semantic understanding.

(4.2) Model

Mapping diverse types of conceptual knowledge into resulting patterns of neural activity presents several challenges. In KRNS-MEANING, the neuroceptual lattice captures and represents the implicit structure of the neural domain and maps it onto the rich hierarchical structure of the semantic domain using Formal Concept Analysis (FCA). A lattice (see Literature Reference No. 1) is a formal mathematical structure that maintains a partial order over data expressing both contextual (by allowing nodes to have multiple parents) and taxonomic information. The ordering relation supports reasoning over the data's attributes (see Literature Reference Nos. 36 and 108) and is used to infer contextual and taxonomic relationships. It is an extremely flexible and robust data structure. Therefore, it is an ideal data structure to discover the unknown relationship between concepts and the neural activity they stimulate.

(4.2.1) Building the Neuroceptual Lattice (Element 324) Using Formal Concept Analysis (FCA)

Figure 4:
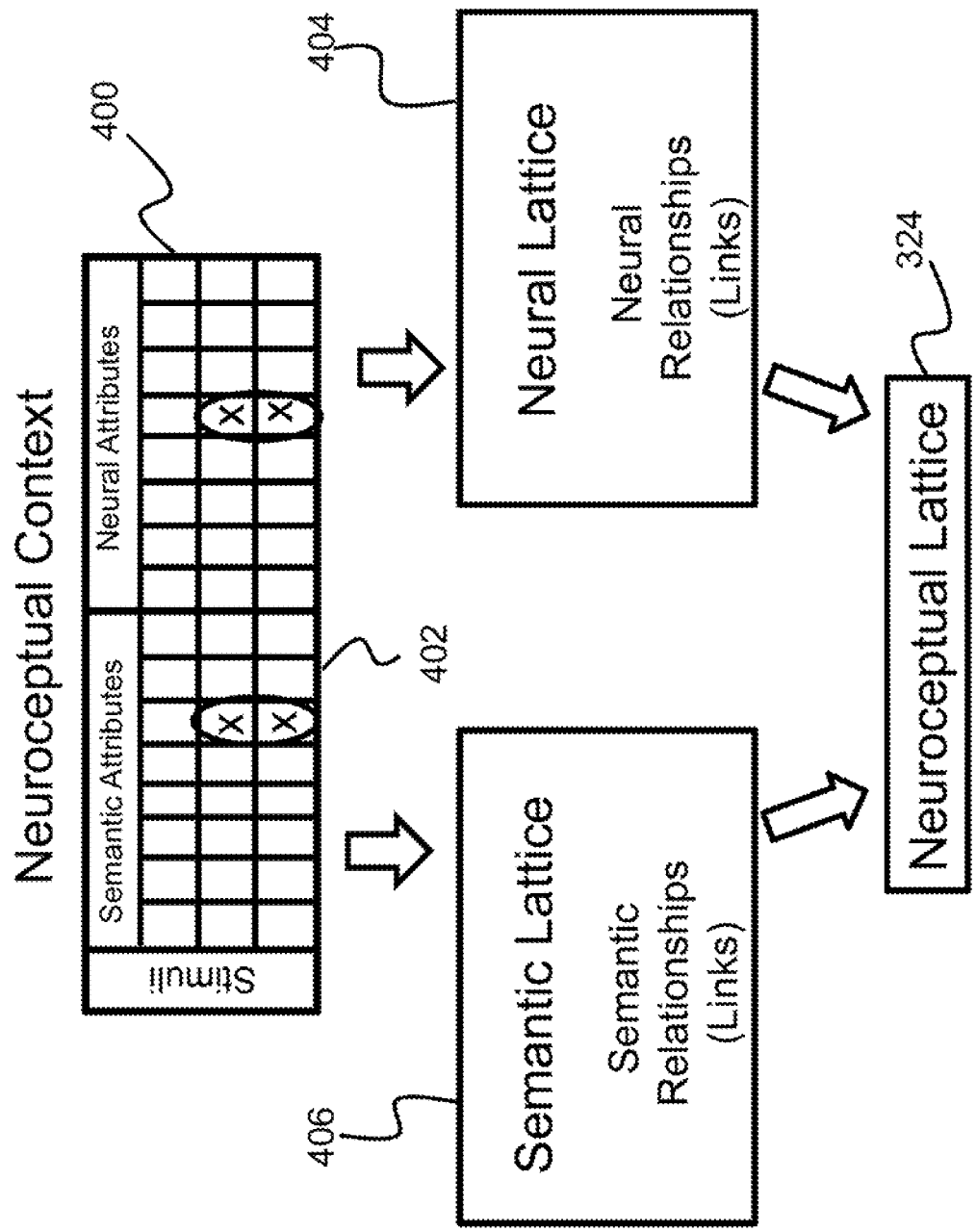
FIG. 4 is an illustration of lattice alignment relating neural features to conceptual knowledge according to various embodiments of the present invention.

FCA is a principled approach using the mathematics of order theory, lattice theory, and set theory (see Literature Reference Nos. 28 and 36) to derive a formal ontology from a collection of objects (e.g., the stimulus set) and their corresponding set of attributes (e.g., neural and semantic features). A concept lattice is a graphical representation of a context table in which rows represent the objects and columns represent attributes. The links between nodes represent taxonomic and contextual relationships between groupings of objects that share a set of attributes (see Literature Reference No. 36). The power of the technique comes from being able to use any information as attributes on the collection of objects, exposing all relationships between sets of objects and the attributes that they have in common. By allowing the attributes to come from two different domains, the structures of both domains are mapped onto a single lattice in a form of maximal correspondence. FIG. 4 illustrates how the columns of a neural context table 400 and a semantic context table 402 (which define a neural lattice 404 and a semantic lattice 406, respectively) are merged into a joint table that defines the neuroceptual lattice 324. The rows of each table are the same: the set of stimulus objects. The key is in the selection of attributes (i.e., the columns).

(4.2.2) Semantic Model (Element 304)

Figure 5:
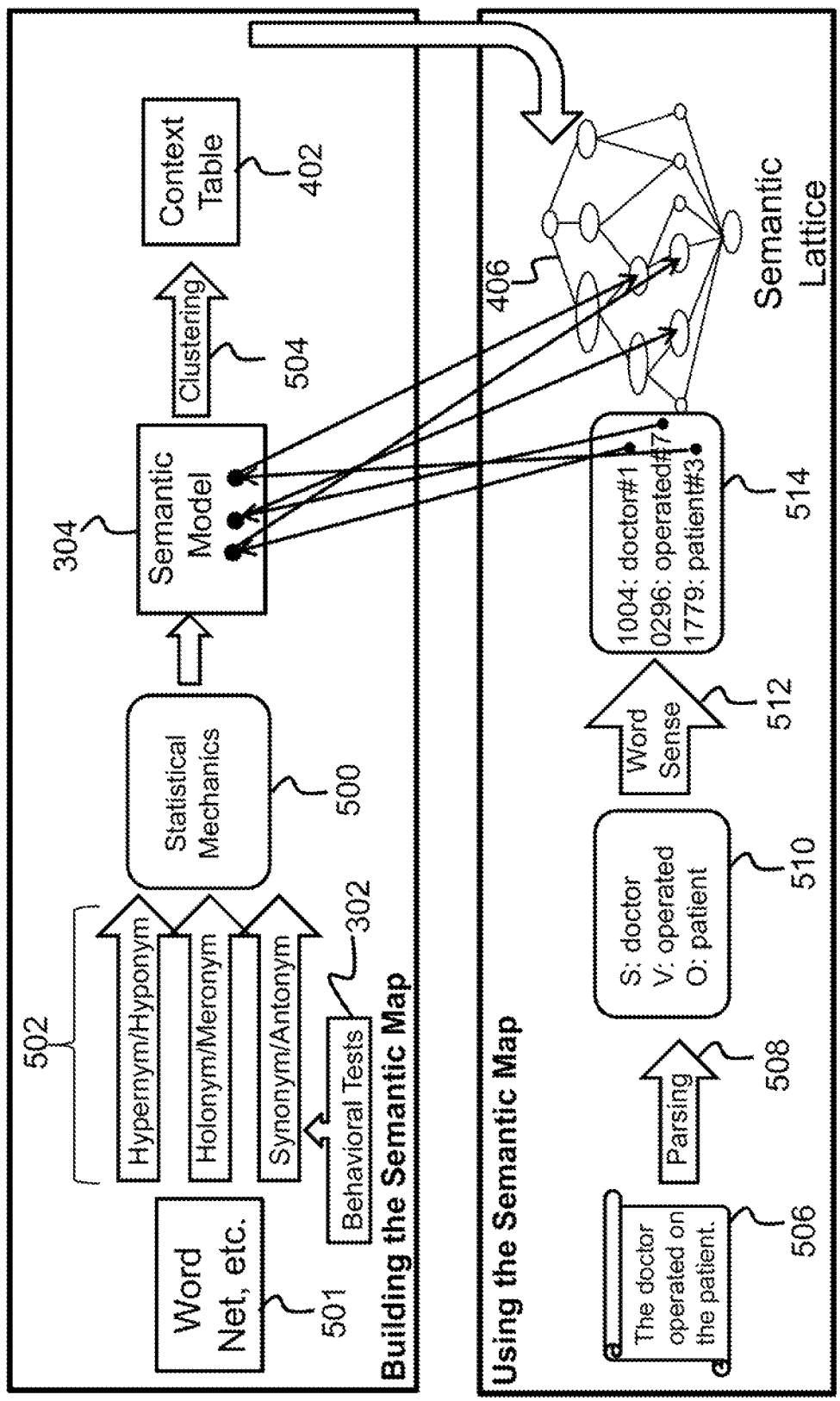
FIG. 5 is an illustration of the construction and use of a semantic map according to various embodiments of the present invention.

Language-independent semantic representations of concepts are defined as continuous-space locations (or distributions). FIG. 5 depicts the construction and utilization of the semantic model 304 according to various embodiments of the present invention. FIG. 5 illustrates two processes. The first enters from the top left and produces a semantic lattice 406. Some form of semantic information is fed into the system. This can be Wordnet 501 (a lexical database for the English language) or any other semantic decomposition of words. The various semantic relationships 502 are extracted (such as hypernym, holonym, etc.) and their degrees represent forces between the words (e.g., antonyms represent a repulsive force, synonyms represent an attractive force). These forces are implemented with a statistical mechanics model 500 causing the points representing words to move to some equilibrium or low energy state. This space of relative positions of concepts represent the semantic model 314. Features (as defined by coordinates within the semantic model 314 space) are clustered 504 used to create a semantic context table 402 and used to produce a semantic lattice 406 (according to formal concept analysis).

The second process enters from the bottom left of FIG. 5 and starts with inputting a sentence 506. The sentence is parsed using any standard parsing technology 508 to produce a parse of the sentence 510 through parsing 508 indicating the main nouns, verbs, and adjectives of the sentence. The particular word sense 512 (a meaning of the word) is extracted giving particular senses of the words 514 (meanings of the words). These words are then looked up in the semantic model 304 to find their relative attributes which are then used to locate nodes in the semantic lattice 406. When the neural attributes are added, creating the neuroceptual lattice, the neural attributes can be read off from the corresponding nodes in the lattice.

The semantic model 304 solves the following challenges. First, different languages and individuals express semantics differently. Leveraging the robustness of a weak semantic model (described in Literature Reference No. 89) across at least four languages, multilingual synonym-antonym dictionaries are merged together to construct a language-independent semantic space. In a weak semantic map, the individual dimensions do not combine in a meaningful way as opposed to a strong map where they do. To capture subject-specific knowledge and value systems, individual subject preferences, detected by their judgment of test stimuli, are best-fitted by a nonlinear coordinate transformation of the universal (objective) semantic space, resulting in personalized (subjective) semantic spaces 314.

Second, linguistic data sources often conflict internally and externally. By merging them together, the quality of the semantic map is improved and its objectivity is ensured. The lattice construction according to various embodiments of the present invention naturally reconciles many seemingly incompatible ontologies, making them complementary in the lattice, which is a more powerful representation compared to an ontology.

Unlike simple ontologies, the present invention is used to construct a semantic model 304 that is continuous, language independent, and internally consistent by designing various "semantic" attractor dynamics that separate words into different regions of space. To account for individual differences, forces are modulated by semantic judgments from behavioral tests 302. Concepts are located within the semantic model 304 and these labels are used to build the semantic lattice 406 and also to locate concepts in the neuroceptual lattice.

Semantic content are derived from attractor dynamics and statistical mechanics 500 with energy functions encoding synonym-antonym, hypernym-hyponym, holonym-meronym (represented by element 502), and other relationships. Further, the semantic content is modulated to account for individual behavior and cognitive measures. Approximately 105 concepts (each defined by a group of words plus a dictionary definition) and their semantic inter-relations were extracted from available online databases (e.g., Wordnet) and electronic media. These data were used to introduce forces among concepts allocated in abstract space (e.g., synonyms attract and antonyms repel each other).

Following previous work, described in Literature Reference Nos. 3, 85, 86, and 91, clearly identifiable semantics of the resulting multidimensional semantic space will arise. Strong BOLD fMRI brain correlates will arise due to consistency of the semantic dimensions according to various embodiments of the present invention with well-known conceptual spaces, such as PAD (pleasure, arousal, dominance) and EPA (evaluation, potency, activity) models (such as described in Literature Reference No. 46), semantic differential (see Literature Reference No. 71), and Circumplex (see Literature Reference No. 84), which are all based on human psychometrics (see Literature Reference No. 83) and rooted in neurophysiology (see Literature Reference No. 61).

To generate the conceptual lattice (semantic lattice), the space is efficiently partitioned into labeled domains by model-based clustering 504 using, for example, the Expectation-Maximization algorithm (see Literature Reference No. 66). Arbitrary new words and sentences are allocated on the semantic model 304 (and thus in the semantic lattice 406) using their semantic relationships with concepts already present in the semantic space 304. The context table 402 is used to construct the concept or semantic lattice 406. The context table 402 is derived from semantic attributes, such as those obtained from Wordnet 501.

To fine-tune the map allocation of a word in a specific context (e.g., in a sentence), the context words (i.e., other words in the sentence) are used in several ways. An example sentence 506 depicted in FIG. 5 is "The doctor operated on the patient." The sentence 506 is parsed 508 into a subject (S), verb (V), and object (O) (represented by element 510). First, the selection of the target word senses 512 is limited to those senses that are relevant to context words. Secondly, the strengths of semantic relations of the target word to words on the map that determine its allocation are modulated by co-occurring semantic relations between context words and those words on the map (represented by element 514). Finally, a rule is defined to automatically allocate entire sentences on the semantic map/model, yielding ordered triplets of space/lattice locations representing the subject, the verb and the object, efficiently capturing the meaning of the sentence.

(4.2.3) Neural Feature Extraction (Element 316)

The ability to predict and interpret neural activity depends critically on neural feature extraction. Good neural features (or neural attributes) are voxels, or transforms over voxels, that are informative and whose relationship to conceptual knowledge is interpretable. This is challenging due to the large number of neural features potentially available, the small number of samples typically available, and the low SNR (signal-to-noise ration) of neural features produced by sensors, such as fMRI.

There are two main causes of low SNR in neural feature data. The first is the mechanics of acquiring the data, the elicitation protocols, and the indirectness of the measure of neural activity (BOLD fMRI; see section 4.3). Extracting temporal features from fMRI involves estimating the hemodynamic response function (HRF) and deconvolving from the BOLD signal; however, this is an ill-posed problem with infinite solutions. Previous methods apply models to constrain the solutions, such as linear combinations of basis sets (see Literature Reference Nos. 5 and 113) and nonlinear state space models (see Literature Reference No. 114); however, they use a predefined model form of the HRF that does not take into account experimental variations and variations between individuals. The present invention learns customized HRFs using sparsity priors to improve the extraction of temporal features. The table in FIG. 15 lists innovations for temporal feature extraction according to various embodiments of the present invention.

The other cause of low SNR is the nonstationarity of subjects in concept elicitation and differences in concept associations between subjects. For a stimulus, a typical set of associations are common, with others less common, and still others obscure. Unsupervised learning to discover latent features is well suited for this, and one solution, IBP (Indian Buffet Process), is described below and in Literature Reference No. 39. Initial pilot study results using latent features to classify 60 categories derived from the dataset in Literature Reference No. 115 show 92% accuracy for the best subject. The system according to the various embodiments of the present invention uses unsupervised latent feature learning in Phase 1A, in combination with functional clustering in Phases 1B and 2. Functional clustering is used as an unsupervised method to select similarly responding voxels to further refine categorical discrimination (see Literature Reference No. 101).

To extract relevant neural features, fMRI images are represented as a combination of various latent features. A binary matrix Z indicates whether a particular latent feature is present or not for a given fMRI image. The IBP algorithm (described in Literature Reference No. 39) computes the prior for latent features as well as the latent feature space. IBP is an infinite latent feature model where the numbers of features are unconstrained and are combined with priors on feature values to produce factorial and continuous representations. The extracted latent features ("A" and its binary counterpart "Z") model the underlying components of hemodynamic activity patterns in a data-driven fashion. "A" is the matrix of latent features and "Z" is a binary matrix that indicates which latent features a data point (an fMRI image in this case) is composed of. The parameters of the model are tuned by how well the resulting neural features match the structure of the semantic features of the stimuli. IBP is run across voxels to determine latent features, where features in common across the same stimuli represent signals and uncommon features represent noise. These features are used to construct a neural lattice. The degree of misalignment between the neural and semantic lattices are used to adjust the IBP parameters until a maximum isomorphism between the two lattices is reached.

To guide selection of more predictive neural features, areas of misalignment are located in the neuroceptual lattice. If an area in the neural lattice is smaller than the corresponding area in the semantic lattice, then those neural attributes are not rich enough to represent out the additional semantic structure. If the area of the neural lattice is larger this means that the neural attributes are noisy or irrelevant to the semantic structure, or explain inter-subject variance. Once the latent features are learned, they are quickly determined in closed form for additional stimuli.

(4.2.4) Neuroceptual Lattice in Prediction and Interpretation and Theory Discovery (Element 328)

The quality and robustness of the neuroceptual lattice is validated by how well it enables prediction and interpretation. The first study using FCA to classify neural data according to various embodiments of the present invention was conducted. Experimental studies using only simple neural features to classify categories from the data of Literature Reference No. 69 demonstrated that the neuroceptual lattice classifies unknown fMRI images to the level of state-of-the-art (82.8% versus 81% (see Literature Reference No. 109)). This was without the help of highly structured semantic information (i.e., semantic lattice) where it excels over current techniques. In fact, analysis on the neuroceptual lattice of the present invention shows that it captures the inherent conceptual structure expected, using the core operation described below for ranking target concepts in KRNS-MEANING.

Once the neuroceptual lattice has been constructed from a set of training concepts (see Literature Reference No. 25), it can be used for prediction. Here, the semantic attributes of each target concept locate the point in the semantic map that is most representative of the concept, which identifies entry points in the neuroceptual lattice. Target concepts are single words or simple sentences that the system is tested on. The system ranks a list of target concepts according to how likely it thinks that the brain activity pattern represents this target concept. Note that once the semantic map has been labeled with coordinates, even novel concepts can be located and, thereby, mapped into the neuroceptual lattice.

Figure 6:
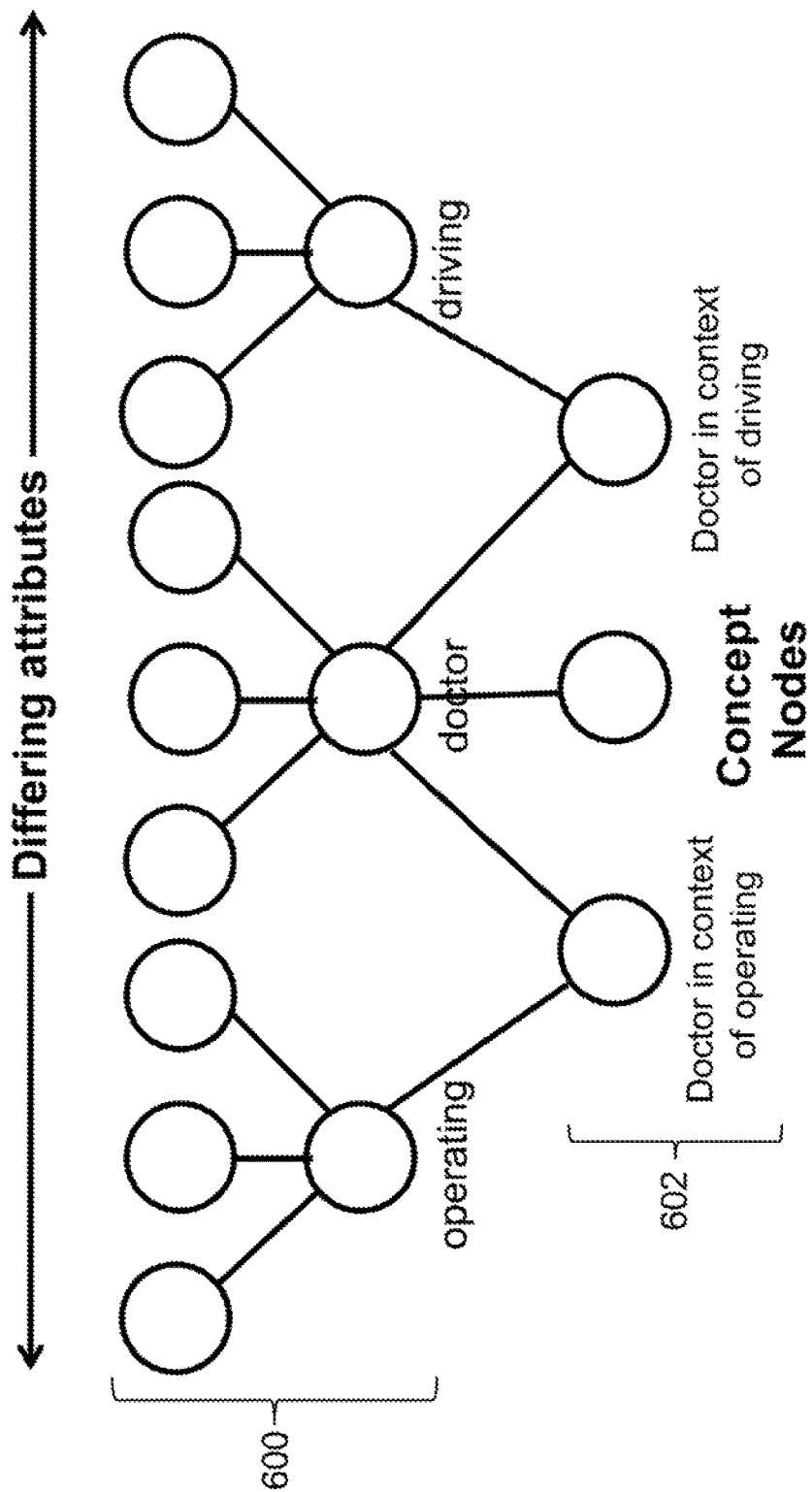
FIG. 6 is an illustration of a neuroceptual lattice as a representation of contextual and taxonomic relationships according to various embodiments of the present invention.

Each attribute has a node in the lattice, near the top, where it first appears. The meet of all the semantic attributes of an unknown concept (the first node below where all the attributes are shared) is located, and the corresponding neural attributes are read off. Because the lattice is a graph, not just a tree, the meet node where all the attributes first come together may have nodes below that also share this set of attributes. FIG. 6 illustrates the neuroceptual lattice 324 representing contextual as well as taxonomic relationships. The neuroceptual lattice 324 comprises a set of nodes 600 representing different attributes, such as "operating", "doctor", and "driving". The nodes below 602 are distinguished by additional attributes, such as some semantic attribute indicating different contexts or the concept as represented by different cohorts. In FIG. 6, the different contexts include "doctor in context of operating" and "doctor in context of driving". These nodes also have some different neural attributes, showing the inter-subject difference or the contextual variability. Further, the upper bound of prediction accuracy within the neuroceptual lattice 324 is related to the ability to differentiate nodes, which relates to the number of attributes. The number of attributes is determined by neural feature extraction, which is modulated by experimental conditions (e.g., SNR, see power analysis, section 4.4).

Interpretation is similar, but starts with neural attributes that must be computed from the given neural signals (voxel activity). These neural attributes correspond directly to ranges of voxel activity, regression coefficients, sets of latent features extracted by the IBP, or other neural features. The neural attributes become the entry points into the neuroceptual lattice to locate the meet node(s), similar to prediction, and the corresponding semantic attributes are read off as the interpretation of the neural activity.

Lattice distance is used as a single numeric score that conveys the extent to which a given neural activity pattern represents a target concept, or to rank a set of target concepts. As described above, given the neural activity of a test concept and a set of target concepts, the corresponding node or set of nodes for each concept are located. The distances within the lattice between the nodes are computed and ranking is performed. Lattice distance depends on height in the lattice. For example, the concept of living versus non-living (high in the lattice) is farther apart than the concept of dog versus cat (lower down) even though each pair may have the same relative relation. Ranking accuracy is limited by the discriminability of the concept nodes.

Figure 7:
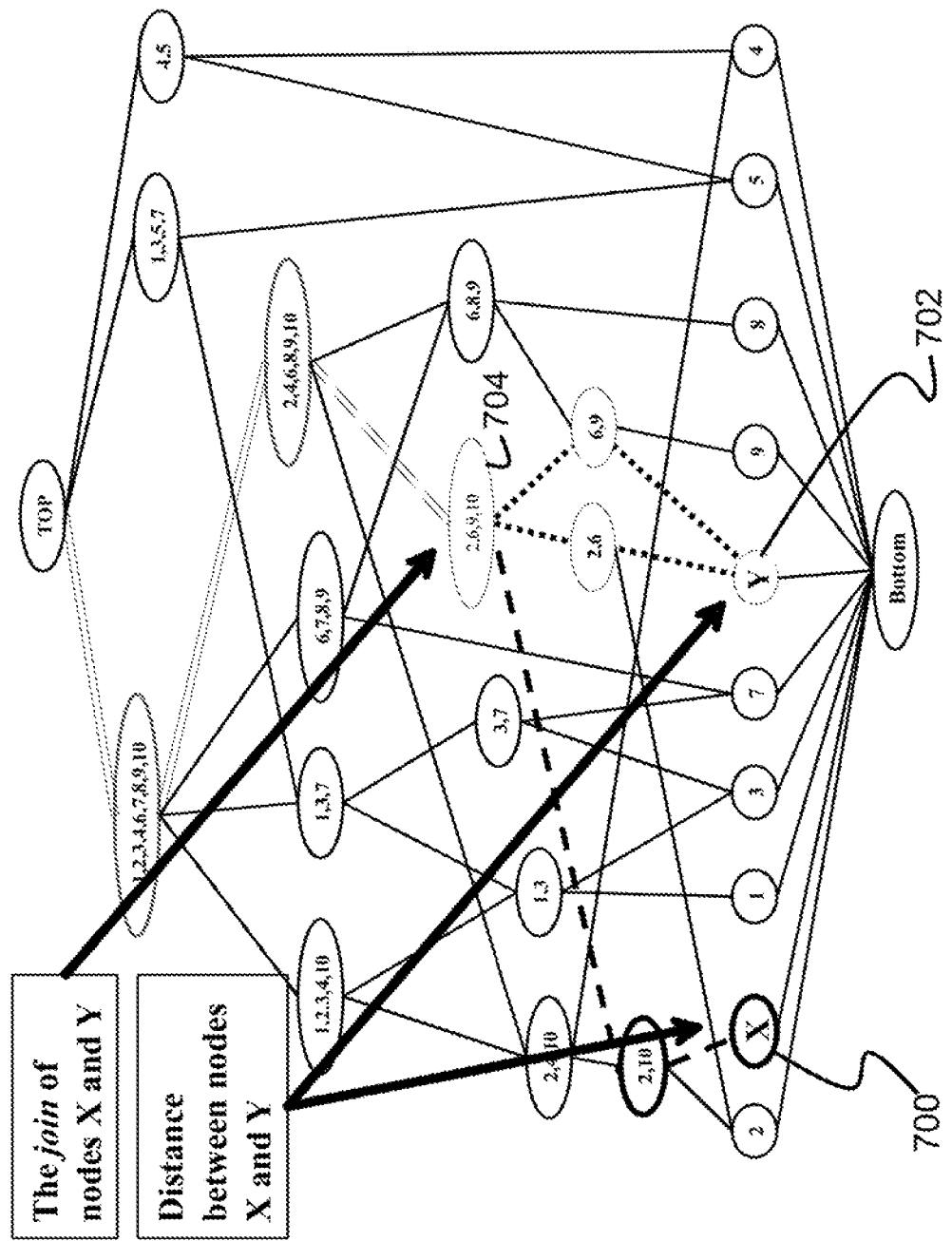
FIG. 7 is an illustration of ranking of concept similarity according to various embodiments of the present invention.

FIG. 7 depicts the ranking of concept similarity accounts for concept generality (represented as the level with the lattice) according to various embodiments of the present invention. The distance between concepts X 700 and Y 702 is greater with the more nodes above that they do not share, and the distance is less with the more nodes above that they do share. To compute the distance, two definitions are required: 1) the join of X 700 and Y 702; and 2) the up-set of a node. The join(X,Y) 704 is the first node above that both X and Y connect to. The up-set(n) is the node n and all the nodes it links to above. |up-set(n)| is the number of nodes contained in the up-set of n. The distance between two nodes is then dist(x,y)=((|up-set(x)|−|up-set(meet(x,y))|)+(|up-set(y)|−|up-set(meet(x,y))|))/|up-set(meet(x,y))|.

Using KRNS-MEANING allows one to go beyond the state for neural theory to explain the manner and extent for the representation of context and concept combinations to quantifying them. Embedded in the neuroceptual lattice are all the neural attribute relationships within and between different semantic concepts (and contexts). From these relationships, neural representational models are quantified. For instance, whether a given semantic area, such as mammals, is representative of a distributed versus categorical or sensory-motor representation scheme is determined. These representations can be hierarchical and recursively embedded within each other (e.g., nested hubs, section 4.1, equations 1-3).

Two methods exist for quantification of neural representational models: 1) The proportion of each representational scheme (e.g., categorical, distributed, sensory-motor) within a semantic category of the lattice is computed from the average number of multi-parent nodes per level. 2) The degree of isomorphism between the sub-lattice of a semantic category (from the experimentally derived neuroceptual lattice) and the theoretically derived "pure" lattice configurations (e.g., categorical vs. distributed) quantifies the proportion of each representation scheme. Specifically, when the sub-lattice and "pure" lattice are joined, the number of additional nodes quantifies dissimilarity. This quantitative method is well suited for theories, since it is at least a semi-metric (symmetric (dist(x, y)=dist(y,x)) and positive definite (d(x,y)>0 if x≠y; d(x,y)=0 if and only if x=y). In the semi-metric, dist denotes distance and defines the properties of a semi-metric type distance between two things (e.g., nodes), x and y.

Figure 15:
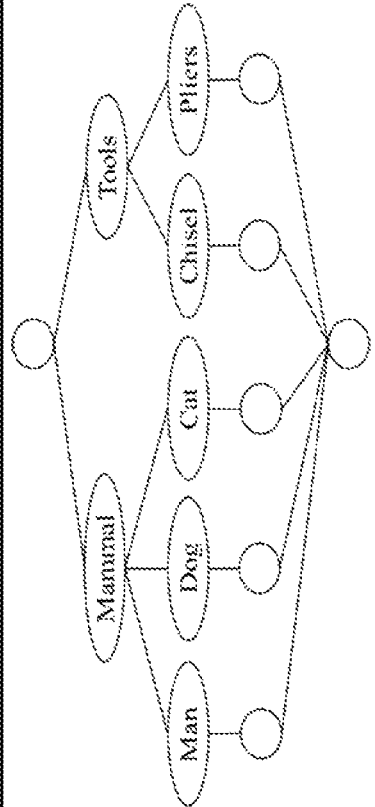
FIG. 15 is an illustration of the quantification of neural representation schemes from the neuroceptual lattice according to various embodiments of the present invention.

FIG. 15 illustrates quantification of neural representation schemes from a neuroceptual lattice. Pure forms of distributed and categorical representation have a very simple structure in the lattice (see Literature Reference No. 30). Neural representation schemes are extracted from the link relations between nodes at different levels for a semantic category. The degree of each neural representation scheme is quantified by the average number of multi-parent nodes per level. Distributed representations 1500 maintain the average number of multi-parent nodes to lower levels, categorical representations 1502 increase the number of single-parent nodes to lower levels, and sensory-motor representations may have either structure, but contain anatomical attributes within sensory-motor regions. This quantified theory discovery directly influences prediction and interpretation in Phases 1b and 2 by adapting the semantic space attributes as the system uses the maximally informative features for each cohort (i.e. temperature for semantic map, feature selection, and functional clustering parameters).

(4.3) Experimental Studies

Previous experiments of conceptual knowledge typically ignore individual differences between subjects. However, through cognitive modeling of individual and cohorts variations, KRNS-MEANING quantifies and exploits these differences using a series of behavioral and adaptive high resolution spatial and temporal imaging experiments.

To maximize the neural decoding abilities of the present invention while maximizing variance between subjects, a behavioral exam is performed prior to fMRI experiments. Individuals and cohorts are tested for differences in semantic judgments as well as multiple languages, college majors, and musical abilities. Data analysis techniques (e.g., multidimensional scaling) and cognitive modeling on behavioral data reveal underlying differences between individuals and cohorts. Modeling semantic representation differences related to expertise are described using the SUSTAIN model (see Literature Reference No. 112). Further, the model parameters further fit individual differences in hierarchical clustering of items, psychological similarity, and attentional emphasis (see Literature Reference Nos. 110 and 111). These efforts guide the search for parallel differences in neural data and the structure of the neuroceptual lattice.

A subset of subjects given the behavioral exam that are found to fit cohort classifications are tested in fMRI experiments. Extensive training performed on a 3T scanner allows one to identify specific features that maximize differences in neural representations between cohorts. This analysis allows one to minimize the experiments by preselecting the best subjects for further experiments—subjects on the extreme ends of language and musical ability in order to maximize differences across cohorts while minimizing scan time in the 7T scanner. The fMRI studies include innovations in neural imaging, as shown in the table in FIG. 16. Subjects tested at the 3T and 7T facilities were used for interpretation and prediction testing.

For measuring concept representations, an engaging, adaptive fMRI experiment is used that maximizes efficiency in scanner time by searching for ambiguities within each subject's neuroceptual lattice. fMRI experiments provide neural data for subject-specific interpretation and prediction engines. Challenges in the adaptive fMRI studies range from practical (e.g., limited scanning time per concept, maintaining subject engagement within and across sessions, and imaging artifacts in 7T) to theoretical (e.g., optimizing concept presentation sequences).

Before the testing, the subjects are told they are going to be randomly inquired for a response. 20% of the trials are pseudo-randomly selected to be followed by an "X" along with a reading comprehension question, to which the subject must respond positively or negatively. For example, the subject is shown "The doctor treated the patient" which is followed by an "X," and the question "Did the nurse treat the patient?" to which the subject would respond negatively. Response latency and accuracy are monitored. These questions ensure the subject is thinking of the concepts of the sentence within the context provided and this provides an assessment of how engaged the subject was during imaging. The assigned button-presses in half of the blocks in each of the conditions are exchanged to minimize clusters of significant activation in motor cortex. This task is more engaging than simply viewing target concepts and has the added benefit of requiring the subjects to keep test concepts in working memory, thus heightening their representational strength compared to passive viewing conditions.

At the end of each session, the neuroceptual lattice is developed and analyzed based on collected data. Concepts which are not distinguishable are found by comparing lattice relationships and finding two or more concepts that contain no unique attributes. These ambiguities are elucidated by presenting additional sentences containing the undifferentiated concepts in subsequent scan sessions to increase SNR.

Figure 8:
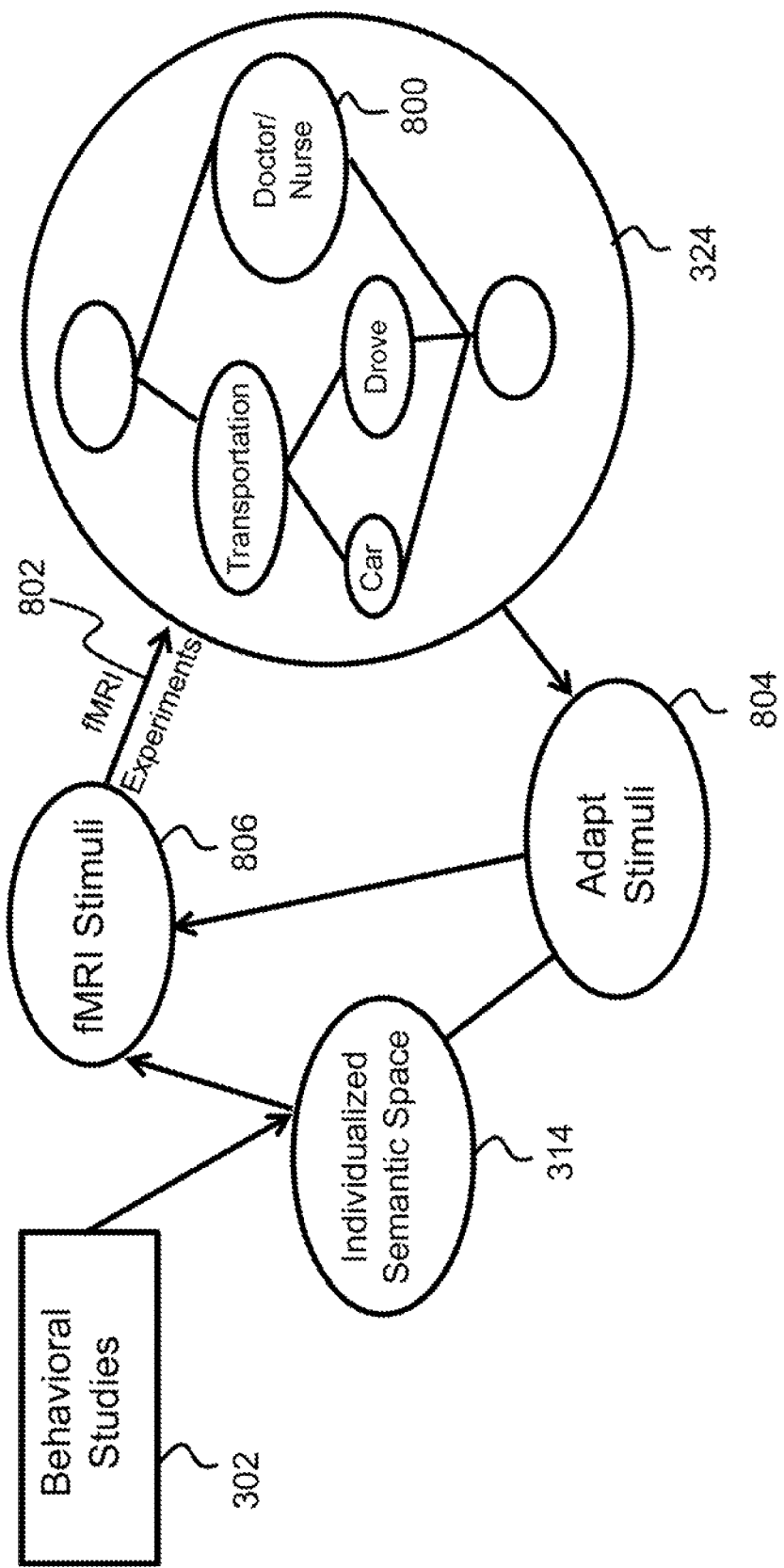
FIG. 8 is an illustration of how ambiguous neural data is found by searching within the neuroceptual lattice according to various embodiments of the present invention.

If additional presentations of the concept do not disambiguate them, the semantic space is searched for related terms that may distinguish the concepts. Ambiguous neural data is found by searching within the neuroceptual lattice. In the example depicted in FIG. 8, the concepts "doctor" and "nurse" (represented by element 800) are not distinguishable in the neural space; "doctor" in the semantic space may identify "surgeon" as a type of doctor, and "doctor" is replaced with "surgeon" in the next training session. FIG. 8 represents the process by which behavioral data and neural data from initial fMRI experiments 802 are used adapt stimuli 804 to select new fMRI stimuli 806 for new fMRI experiments 802 to build a more accurate and detailed neuroceptual lattice 324. Element 302 represents data from behavioral studies, and element 314 represents the process and resulting individualized semantic space that utilizes data from the behavioral studies 302. The fMRI stimuli 806 are adapted (element 804) based on the neuroceptual lattice 324 built from fMRI experiment 802 data. This has the benefit of maximizing scanner time efficiency and generalizability to novel concepts by sampling throughout the neuroceptual lattice 324.

Additional concepts which fall outside those given within the development concepts are given during system tuning ("training"). The semantic lattice is then used during training and testing (evaluation on new concepts) to dictate the stimulus ordering to avoid concept habituation and present the concepts that maximize the distinguishable concept features, improving prediction and interpretation. For Phase 1a, the training uses trajectories from the sematic space similar to the development concepts. In Phases 1b and 2, to guide the training for unknown concepts in Phase 1b and 2, the space that encompasses the entirety of the development concepts is divided to train on additional concepts, respectively, to span the semantic space. Areas of the semantic space that performed worse in prediction and interpretation account for a higher percent of the additional training concepts.

Brain imaging methods that specifically have high temporal resolution can reveal effects of contextual modulation, such as conceptual access, grammatical role, or adjectival modification (e.g., MEG). Methods have been developed to use these high temporal resolution representations of composition to complement the fMRI scans with lower temporal resolution (see SCCAN in the table in FIG. 16). Further, high temporal resolution neuroimaging identifies the active regions connected through HAA hubs in specific sequences for training concepts to decrease fMRI acquisition time to specific regions of interest (ROIs) in sequence. The temporal sequences through HAAs are obtained from fMRI as a set of sequential ROIs which help maximize prediction and interpretation (via the interpretation and prediction engine 328) according to various embodiments of the present invention.

(4.4) Data Sources

The following section begins with a description of behavioral screening for cohorts and a power analysis based on fMRI acquired from the literature for HAAs. Subsequently, the sources and corpora for the semantic model are described.

Participants were recruited from the undergraduate population. To screen for differences, the survey included questions about musical experience, language acquisition, measures of general vocabulary, college courses, and the degree to which spatial or visual representations are used in their areas of study (e.g., artists, designers, and scientists).

To establish power, BOLD activation data in the angular gyrus region of interest from a recent closely related study (see Literature Reference No. 17) was used. Employing Bonner et al 2013's lexical decision task (~10 minutes) in a population analysis (n=20), effect sizes at the individual level averaged 1.07 for concept-induced angular gyrus activation relative to pseudowords (mean activation relative to baseline pseudo words=0.66). Therefore, with standard BOLD fMRI and traditional statistical methods, a power of 0.86 was obtained to detect an effect of 1.07 with significance level 0.001 and 20 subjects. For a standard power of 0.8 and 0.05 significance, only 7 subjects were required. The previously described multivariate methods increase the effect size (population $R^2$) by at least 15%, thus a power of 0.95 with alpha 0.001 was achieved with a sample size of 26 subjects, where 5 or more regions are required to differentiate concepts. If only 2 regions are needed, sample size decreases to 20. This conservative and high-powered initial sample size estimate is reported in order to control for multiple comparisons. In KRNS-MEANING, empirical estimates of accuracy for each step of the neuroimaging process refines estimation of the upper bound prediction accuracy.

Semantic inter-relations were extracted from available online databases and electronic media, such as WordNet (see Literature Reference No. 34) and Microsoft Word Proofing Tools Thesaurus (both available in >50 languages), as well as Oxford Dictionary, Apple Dictionary, VerbNet, and Wiktionary. Additional semantic relations and statistical data (such as word and n-gram frequencies) were also extracted from other resources (e.g., British National Corpus). These data are used to introduce forces among concepts allocated in abstract space (e.g., synonyms attract and antonyms repel each other).

A wide variety of imaging hardware is employed to record neural data at both fine spatial and temporal scales. Non-limiting examples of machine specifications and parameters for data acquisition and analysis are described below. A Siemens 3.0T Trio scanner was used for anatomical scans and functional scans. The anatomical scans included a T1-weighted structural image using an MPRAGE protocol (TR=3000 ms (milliseconds), TE=3 ms, flip angle=15°, 1 mm (millimeter) slice thickness, 192×256 matrix, resolution=0.9766×0.9766×1 mm). TE (repetition time) is the amount of time that exists between successive pulse sequences applied to the same slice. TE (echo time) represents the time in milliseconds between the application of the 90° pulse and the peak of the echo signal in spin echo and inversion recovery pulse sequences. Parameters for functional scans include fat saturation, 3 mm isotropic voxels, a flip angle of 90°, TR=3 s, TEeff (effective echo time)=30 ms, and a 64×64 matrix, with a 2 minute break between blocks. Analysis parameters included image processing and statistical analyses with SPM8 to remove low-frequency drifts, and a high-pass filter was applied. Autocorrelations were removed with a first-order autoregressive model. First, each participant's data was individually modeled. Functional images were realigned to the first image (as described in Literature Reference No. 35), coregistered with the structural image (as described in Literature Reference No. 4), and normalized to standard Montreal Neurological Institute (MNI) space using unified segmentation with resampling of images into isotropic 2 mm voxels (as described in Literature Reference No. 5).

For 7T scans, a Siemens 7.0T Magnetom scanner (and similar for 10.5T scans) was used. The parameters for anatomical scans included the following. T1 weighted (1 mm3) using an MPRAGE sequence (TR=2500 ms; T1=5000 ms; TE=−3.67 ms. For functional scans, 1.1 mm voxels, 123 slices matrix; 190×190, TR=2.4 s/TE=20 msec, 32 channel coil, MB (multiband factor)=3, 10.5 minute scan, 52 Gb raw data size, raw data rate: 4.8 Gb/min. The analysis parameters for 7T (standard) included 30 minutes to reconstruct (2.8× the scan time). For 7T(GPU): 13.5 min (1.3× the scan time). Non-EPI (echo planar imaging)-based reference scan reduces the scan time and optimizes image reconstruction steps, including grappa kernel modifications.

For MEG, a whole-head 157-channel axial gradiometer system (Kanazawa Institute of Technology, Nonoichi, Japan) was used. 3 3-axis magnetometers were used as reference channels to record ambient environmental noise. The recording device was situated in a magnetically shielded room (VAC GmbH, Hanau, Germany) which is additionally equipped with active shielding (active compensation coils). For anatomical scans, a Siemens Allegra 3T head-only MRI scanner was used with the same parameters as Siemens 3.0T Trio scanner described above. The analysis parameters used are described in Literature Reference Nos. 10 and 20 with the lme4 package (see Literature Reference No. 12) in R (R Development Core Team, 2006).

The table in FIG. 17 describes analysis techniques used for different data sources. Finally, key methods in image processing used by the present invention include the following. For reconstruction, fast GPU-based volume reconstruction was used. For corrections and filtering, distortion, motion and slice timing corrections, and spatial smoothing were applied. Advanced static field distortions were estimated using reversed pulse echo gradients in EPI imaging with top up FMRIB software library (FSL) for corrections. For spatial normalization, statistical parametric mapping (SPM) and FSL were used as well as advanced normalization tools (ANTS) tool (see Literature Reference No. 7). The following were analysis methods and techniques used for modeling and statistical analysis: deconvolution: LS-S (least squares separate) and GLMs (generalized linear models) (see Literature Reference No. 76), and MVPA (multi-voxel pattern analysis) (see Literature Reference Nos. 26, 52, 59, and 82).

The present invention has multiple applications in predicting and interpreting conceptual knowledge in the brain. For instance, the system according to embodiments of the present invention can be used to determine how consumers assess product concepts, such as any negative association or confusion with other product concepts. An additional application is mind reading and detection of deceit. For example, the present invention can be utilized to determine if an interviewee is thinking of a particular place that doesn't match what they are saying.

Further, the system according to various embodiments can be used to interpret neural data to assess user emotions, interpret images and/or text, and to perform vehicle control. The system described herein is suitable for any application that requires analyzing massive amounts of brain data and making sense of it.

What is claimed is:

1. A system for explaining how the human brain represents conceptual knowledge, the system comprising:
    one or more processors having associated memory with executable instructions encoded thereon such that when executed, the one or more processors perform operations of:
        creating a neuroceptual lattice comprising a plurality of nodes representing attributes by aligning a set of semantic features and a set of neural features;
        identifying structures in the neuroceptual lattice to quantify an extent to which the set of neural features represents a target concept; and
        using the identified structures in the neuroceptual lattice to determine what concept a test subject is thinking about based on a sensor reading.

2. The system as set forth in claim 1, wherein the one or more processors further perform operations of:
    developing a semantic model;
    performing at least one behavioral exam to assess a calibration subject into at least one cohort and reveal semantic relationships to modify a personalized semantic space developed by the semantic model;
    extracting a set of semantic features from the personalized semantic space; and
    extracting a set of neural features from neuroimaging of the human subject.

3. The system as set forth in claim 2, wherein lattice distance between at least two nodes in the neuroceptual lattice is used to rank a set of target concepts to quantify the extent to which the set of neural features represents the target concept, such that as lattice distance increases, concept similarity decreases, and as lattice distance decreases, concept similarity increases.

4. The system as set forth in claim 3, wherein the one or more processors further perform operations of:
    aligning a neural lattice and a semantic lattice to create the neuroceptual lattice; and
    using adaptive neuroimaging to analyze the neuroceptual lattice to improve alignment between the neural lattice and the semantic lattice.

5. The system as set forth in claim 4, wherein the one or more processors further perform operations of:
    processing a set of semantic information and extracting semantic relationships from the set of semantic information;
    using the semantic relationships to generate the semantic model;
    parsing an input sentence and extracting a meaning of each word in the sentence;
    using the semantic model to identify at least one word in the sentence to identify a relevant semantic attribute which is then used to locate at least one node in the semantic lattice; and
    using the neuroceptual lattice to identify at least one neural attribute corresponding to the at least one node in the semantic lattice.

6. The system as set forth in claim 1, wherein the one or more processors further perform operations of:
    generating an ordered list of likely target concepts of which the test subject is thinking; and
    given a target concept, determining a likely neural activity pattern in the test subject corresponding to the target concept.

7. The system as set forth in claim 1, wherein the one or more processors further perform operations of:
    quantifying target concepts along multiple contextual dimensions; and
    mapping novel target concepts into the neuroceptual lattice.

8. A computer-implemented method for explaining how the human brain represents conceptual knowledge, comprising:
    an act of causing one or more processors to execute instructions stored on a non-transitory memory such that upon execution, the one or more processors perform operations of:
        creating a neuroceptual lattice comprising a plurality of nodes representing attributes by aligning a set of semantic features and a set of neural features;
        identifying structures in the neuroceptual lattice to quantify an extent to which the set of neural features represents a target concept; and
        using the identified structures in the neuroceptual lattice to determine what concept a test subject is thinking about based on a sensor reading.

9. The method as set forth in claim 8, wherein the one or more processors further perform operations of:
    developing a semantic model;
    performing at least one behavioral exam to assess a calibration subject into at least one cohort and reveal semantic relationships to modify a personalized semantic space developed by the semantic model;
    extracting a set of semantic features from the personalized semantic space; and
    extracting a set of neural features from neuroimaging of the calibration subject.

10. The method as set forth in claim 9, wherein lattice distance between at least two nodes in the neuroceptual lattice is used to rank a set of target concepts to quantify the extent to which the set of neural features represents the target concept, such that as lattice distance increases, concept similarity decreases, and as lattice distance decreases, concept similarity increases.

11. The method as set forth in claim 10, wherein the one or more processors further perform operations of:
    aligning a neural lattice and a semantic lattice to create the neuroceptual lattice; and using adaptive neuroimaging to analyze the neuroceptual lattice to improve alignment between the neural lattice and the semantic lattice.

12. The method as set forth in claim 11, wherein the one or more processors further perform operations of:
processing a set of semantic information and extracting semantic relationships from the set of semantic information;
using the semantic relationships to generate the semantic model;
parsing an input sentence and extracting a meaning of each word in the sentence;
using the semantic model to identify at least one word in the sentence to identify a relevant semantic attribute which is then used to locate at least one node in the semantic lattice; and
using the neuroceptual lattice to identify at least one neural attribute corresponding to the at least one node in the semantic lattice.

13. The method as set forth in claim 8, wherein the one or more processors further perform operations of;
generating an ordered list of likely target concepts of which the test subject is thinking; and
given a target concept, determining a likely neural activity pattern in the test subject corresponding to the target concept.

14. A computer program product for explaining how the human brain represents conceptual knowledge, the computer program product comprising:
computer-readable instructions stored on a non-transitory computer-readable medium that are executable by a computer having one or more processors for causing the processor to perform operations of:
creating a neuroceptual lattice comprising a plurality of nodes representing attributes by aligning a set of semantic features and a set of neural features;
identifying structures in the neuroceptual lattice to quantify an extent to which the set of neural features represents a target concept; and
using the identified structures in the neuroceptual lattice to determine what concept a test subject is thinking about based on a sensor reading.

15. The computer program product as set forth in 14, further comprising instructions for causing the one or more processors to perform operations of:
developing a semantic model;
performing at least one behavioral exam to assess a calibration subject into at least one cohort and reveal semantic relationships to modify a personalized semantic space developed by the semantic model;
extracting a set of semantic features from the personalized semantic space; and
extracting a set of neural features from neuroimaging of the calibration subject.

16. The computer program product as set forth in claim 15, wherein lattice distance between at least two nodes in the neuroceptual lattice is used to rank a set of target concepts to quantify the extent to which the set of neural features represents the target concept, such that as lattice distance increases, concept similarity decreases, and as lattice distance decreases, concept similarity increases.

17. The computer program product as set forth in claim 16, further comprising instructions for causing the one or more processors to perform operations of:
aligning a neural lattice and a semantic lattice to create the neuroceptual lattice; and
using adaptive neuroimaging to analyze the neuroceptual lattice to improve alignment between the neural lattice and the semantic lattice.

18. The computer program product as set forth in claim 17, further comprising instructions for causing the one or more processors to perform operations of:
processing a set of semantic information and extracting semantic relationships from the set of semantic information;
using the semantic relationships to generate the semantic model;
parsing an input sentence and extracting a meaning of each word in the sentence;
using the semantic model to identify at least one word in the sentence to identify a relevant semantic attribute which is then used to locate at least one node in the semantic lattice; and
using the neuroceptual lattice to identify at least one neural attribute corresponding to the at least one node in the semantic lattice.

19. The computer program product as set forth in claim 14, further comprising instructions for causing the one or more processors to perform operations of:
generating an ordered list of likely target concepts of which the test subject is thinking; and
given a target concept, determining a likely neural activity pattern in the test subject corresponding to the target concept.

20. The computer program product as set forth in claim 14, further comprising instructions for causing the one or more processors to perform operations of:
quantifying target concepts along multiple contextual dimensions; and
mapping novel target concepts into the neuroceptual lattice.

* * * * *